United States Patent
Lee et al.

(10) Patent No.: US 6,736,750 B1
(45) Date of Patent: May 18, 2004

(54) FAMILY OF MULTI-SPEED PLANETARY TRANSMISSION MECHANISMS HAVING CLUTCH INPUT

(75) Inventors: Chunhao J. Lee, Troy, MI (US); Norman Kenneth Bucknor, Troy, MI (US); Madhusudan Raghavan, West Bloomfield, MI (US); Patrick Benedict Usoro, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/284,062

(22) Filed: Oct. 30, 2002

(51) Int. Cl.$^7$ ................................ F16H 3/62
(52) U.S. Cl. ............... 475/276; 475/280; 475/296
(58) Field of Search ................ 475/276, 280, 475/282, 284, 286, 296, 314, 320, 326, 330

(56) References Cited

U.S. PATENT DOCUMENTS

| | | | |
|---|---|---|---|
| 4,070,927 A | 1/1978 | Polak | 74/765 |
| 4,709,594 A | 12/1987 | Maeda | 74/753 |
| 5,030,186 A * | 7/1991 | Asada | 475/330 X |
| 5,057,063 A * | 10/1991 | Asada et al. | 475/280 X |
| 5,106,352 A | 4/1992 | Lepelletier | 475/280 |
| 5,599,251 A | 2/1997 | Beim et al. | 475/275 |
| 6,053,839 A | 4/2000 | Baldwin et al. | 475/281 |
| 6,071,208 A | 6/2000 | Koivunen | 475/275 |
| 6,083,135 A | 7/2000 | Baldwin et al. | 475/276 |
| 6,217,474 B1 | 4/2001 | Ross et al. | 475/269 |
| 6,425,841 B1 * | 7/2002 | Haka | 475/286 X |
| 6,558,287 B2 * | 5/2003 | Hayabuchi et al. | 475/286 X |

FOREIGN PATENT DOCUMENTS

| | | | | |
|---|---|---|---|---|
| JP | 402154840 | * | 6/1990 | 475/280 |
| JP | 9-126283 | | 5/1997 | |
| WO | 2079671 | * | 10/2002 | |

* cited by examiner

Primary Examiner—Ha Ho
(74) Attorney, Agent, or Firm—Kathryn A. Marra

(57) ABSTRACT

A family of power transmissions having first, second, and third planetary gearsets and six torque-transmitting mechanisms. The first planetary gearset is continuously interconnected with a member of the second planetary gearset and a member of the third planetary gearset. The second planetary gearset is continuously interconnected with a member of the third planetary gearset. The six torque-transmitting mechanisms are selectively engaged in combinations of two to establish at least seven forward speed ratios and one reverse speed ratio within the planetary gearsets.

5 Claims, 16 Drawing Sheets

| | Ratios | 50 | 52 | 54 | 56 | 58 | 60 |
|---|---|---|---|---|---|---|---|
| Reverse | -2.47 | X | | | | | X |
| Neutral | | | | | | | X |
| 1 | 5.16 | | | X | | | X |
| 2 | 3.24 | | | X | | X | |
| 3 | 2.46 | | | X | X | | |
| 4 | 1.82 | X | | X | | | |
| 5 | 1.39 | | X | X | | | |
| 6 | 1.00 | X | X | | | | |
| 7 | 0.71 | | X | | | X | |

(X = engaged)

Ring Gear/Sun Gear Tooth Ratio: $\frac{R_1}{S_1} = 2.5, \frac{R_2}{S_2} = 2.70, \frac{R_3}{S_3} = 2.47$

| Ratio Spread | 7.25 |
|---|---|
| Ratio Steps | |
| Rev/1 | -0.48 |
| 1/2 | 1.59 |
| 2/3 | 1.32 |
| 3/4 | 1.35 |
| 4/5 | 1.31 |
| 5/6 | 1.39 |
| 6/7 | 1.41 |

| | Ratios | 150 | 152 | 154 | 156 | 158 | 160 |
|---|---|---|---|---|---|---|---|
| Reverse | -2.41 | | | X | | X | |
| Neutral | | | | | | X | |
| 1 | 3.94 | | X | | | X | |
| 2 | 2.51 | | X | | | | X |
| 3 | 1.91 | | X | | X | | |
| 4 | 1.57 | | X | X | | | |
| 5 | 1.30 | X | X | | | | |
| 6 | 1.00 | X | | X | | | |
| 7 | 0.71 | X | | | | | X |

(X = engaged)

Ring Gear/Sun Gear Tooth Ratio: $\frac{R_1}{S_1} = 2.22, \frac{R_2}{S_2} = 2.94, \frac{R_3}{S_3} = 2.41$

| Ratio Spread | 5.58 |
|---|---|
| Ratio Steps | |
| Rev/1 | -0.61 |
| 1/2 | 1.57 |
| 2/3 | 1.31 |
| 3/4 | 1.22 |
| 4/5 | 1.21 |
| 5/6 | 1.30 |
| 6/7 | 1.41 |

| | Ratios | 250 | 252 | 254 | 256 | 258 | 260 |
|---|---|---|---|---|---|---|---|
| Reverse | -2.41 | | | X | | X | |
| Neutral | | | | | | X | |
| 1 | 3.94 | X | | | | X | |
| 2 | 2.51 | X | | | | | X |
| 3 | 1.91 | X | | | X | | |
| 4 | 1.57 | | X | X | | | |
| 5 | 1.30 | X | X | | | | |
| 6 | 1.00 | X | | X | | | |
| 7 | 0.71 | X | | | | | X |

(X = engaged)

Ring Gear/Sun Gear Tooth Ratio: $\frac{R_1}{S_1} = 2.22, \frac{R_2}{S_2} = 2.94, \frac{R_3}{S_3} = 2.41$

| Ratio Spread | 5.58 |
|---|---|
| Ratio Steps | |
| Rev/1 | -0.61 |
| 1/2 | 1.57 |
| 2/3 | 1.31 |
| 3/4 | 1.22 |
| 4/5 | 1.21 |
| 5/6 | 1.30 |
| 6/7 | 1.41 |

| | Ratios | 350 | 352 | 354 | 356 | 358 | 360 |
|---|---|---|---|---|---|---|---|
| Reverse | -2.19 | X | | | | | X |
| Neutral | | | | | | | X |
| 1 | 3.70 | | | X | | | X |
| 2 | 2.20 | | | X | | X | |
| 3 | 1.69 | | | X | X | | |
| 4 | 1.30 | X | | X | | | |
| 5 | 1.00 | | X | X | | | |
| 6 | 0.75 | X | X | | | | |
| 7 | 0.56 | | X | | | X | |

(X = engaged)

Ring Gear/Sun Gear Tooth Ratio: $\frac{R_1}{S_1} = 2.92, \frac{R_2}{S_2} = 2.94, \frac{R_3}{S_3} = 2.70$

| Ratio Spread | 6.66 |
|---|---|
| Ratio Steps | |
| Rev/1 | -0.59 |
| 1/2 | 1.68 |
| 2/3 | 1.30 |
| 3/4 | 1.29 |
| 4/5 | 1.30 |
| 5/6 | 1.34 |
| 6/7 | 1.34 |

| | Ratios | 450 | 452 | 454 | 456 | 458 | 460 |
|---|---|---|---|---|---|---|---|
| Reverse | -2.99 | | | | X | | X |
| Neutral | | | | | | | X |
| 1 | 3.94 | | | X | | | X |
| 2 | 2.01 | | | X | | X | |
| 3 | 1.54 | | | X | X | | |
| 4 | 1.27 | | X | X | | | |
| 5 | 1.00 | | X | | X | | |
| 6 | 0.91 | | X | | | X | |
| 7 | 0.66 | X | | | | X | |

(X = engaged)

Ring Gear/Sun Gear Tooth Ratio: $\frac{R_1}{S_1} = 2.53, \frac{R_2}{S_2} = 2.94, \frac{R_3}{S_3} = 2.99$

| Ratio Spread | 6.02 |
|---|---|
| Ratio Steps | |
| Rev/1 | -0.76 |
| 1/2 | 1.96 |
| 2/3 | 1.30 |
| 3/4 | 1.22 |
| 4/5 | 1.27 |
| 5/6 | 1.09 |
| 6/7 | 1.39 |

| | Ratios | 550 | 552 | 554 | 556 | 558 | 560 |
|---|---|---|---|---|---|---|---|
| Reverse | -4.83 | | | X | | | X |
| Neutral | | | | X | | | |
| 1 | 4.05 | | | X | X | | |
| 2 | 2.09 | | X | | X | | |
| 3 | 1.40 | X | | | X | | |
| 4 | 1.00 | X | X | | | | |
| 5 | 0.90 | X | | X | | | |
| 6 | 0.86 | X | | | | X | |
| 7 | 0.61 | | X | | | X | |

*(X = engaged)*

Ring Gear/Sun Gear Tooth Ratio: $\frac{R_1}{S_1}=2.50, \frac{R_2}{S_2}=1.72, \frac{R_3}{S_3}=1.80$

| Ratio Spread | 6.61 |
|---|---|
| Ratio Steps | |
| Rev/1 | -1.19 |
| 1/2 | 1.94 |
| 2/3 | 1.49 |
| 3/4 | 1.40 |
| 4/5 | 1.11 |
| 5/6 | 1.05 |
| 6/7 | 1.40 |

| | Ratios | 650 | 652 | 654 | 656 | 658 | 660 |
|---|---|---|---|---|---|---|---|
| Reverse | -5.39 | | | X | | | X |
| Neutral | | | | | | | X |
| 1 | 3.50 | | X | | | | X |
| 2 | 1.85 | | X | | X | | |
| 3 | 1.32 | | X | | | X | |
| 4 | 1.00 | X | X | | | | |
| 5 | 0.87 | X | | | | X | |
| 6 | 0.81 | X | | X | | | |
| 7 | 0.66 | X | | | X | | |

(X = engaged)

*Ring Gear/Sun Gear Tooth Ratio:* $\frac{R_1}{S_1} = 1.95, \frac{R_2}{S_2} = 1.54, \frac{R_3}{S_3} = 2.50$

| Ratio Spread | 5.30 |
|---|---|
| Ratio Steps | |
| Rev/1 | -1.54 |
| 1/2 | 1.89 |
| 2/3 | 1.40 |
| 3/4 | 1.32 |
| 4/5 | 1.15 |
| 5/6 | 1.08 |
| 6/7 | 1.22 |

|   | Ratios | 750 | 752 | 754 | 756 | 758 | 760 |
|---|---|---|---|---|---|---|---|
| Reverse | -5.39 |  |  | X | X |  |  |
| Neutral |  |  |  |  | X |  |  |
| 1 | 3.50 |  | X |  | X |  |  |
| 2 | 1.85 |  | X |  |  | X |  |
| 3 | 1.32 |  | X |  |  |  | X |
| 4 | 1.00 | X | X |  |  |  |  |
| 5 | 0.87 | X |  |  |  |  | X |
| 6 | 0.81 | X |  | X |  |  |  |
| 7 | 0.66 | X |  |  |  | X |  |

*(X = engaged)*

Ring Gear/Sun Gear Tooth Ratio: $\frac{R_1}{S_1} = 1.95, \frac{R_2}{S_2} = 1.54, \frac{R_3}{S_3} = 2.50$

| Ratio Spread | 5.30 |
|---|---|
| Ratio Steps |  |
| Rev/1 | -1.54 |
| 1/2 | 1.89 |
| 2/3 | 1.40 |
| 3/4 | 1.32 |
| 4/5 | 1.15 |
| 5/6 | 1.08 |
| 6/7 | 1.22 |

| | Ratios | 850 | 852 | 854 | 856 | 858 | 860 |
|---|---|---|---|---|---|---|---|
| Reverse | -0.93 | X | | | | | X |
| Neutral | | X | | | | | |
| 1 | 2.28 | X | | | X | | |
| 2 | 1.63 | | X | | X | | |
| 3 | 1.00 | | | X | X | | |
| 4 | 0.77 | | X | X | | | |
| 5 | 0.70 | X | | X | | | |
| 6 | 0.57 | | | X | | X | |
| 7 | 0.39 | | | X | | | X |

(X = engaged)

Ring Gear/Sun Gear Tooth Ratio: $\frac{R_1}{S_1} = 2.50, \frac{R_2}{S_2} = 2.38, \frac{R_3}{S_3} = 1.51$

| Ratio Spread | 5.86 |
|---|---|
| Ratio Steps | |
| Rev/1 | -0.41 |
| 1/2 | 1.40 |
| 2/3 | 1.63 |
| 3/4 | 1.30 |
| 4/5 | 1.10 |
| 5/6 | 1.23 |
| 6/7 | 1.45 |

| | Ratios | 950 | 952 | 954 | 956 | 958 | 960 |
|---|---|---|---|---|---|---|---|
| Reverse | -1.51 | X | | | | | X |
| Neutral | | | | | | | X |
| 1 | 3.31 | | X | | | | X |
| 2 | 1.51 | | X | | | X | |
| 3 | 1.00 | | X | X | | | |
| 4 | 0.83 | | X | | X | | |
| 5 | 0.69 | X | X | | | | |
| 6 | 0.57 | X | | | X | | |
| 7 | 0.43 | X | | X | | | |

(X = engaged)

Ring Gear/Sun Gear Tooth Ratio: $\frac{R_1}{S_1}=1.51, \frac{R_2}{S_2}=1.51, \frac{R_3}{S_3}=2.22$

| Ratio Spread | 7.73 |
|---|---|
| Ratio Steps | |
| Rev/1 | -0.46 |
| 1/2 | 2.19 |
| 2/3 | 1.51 |
| 3/4 | 1.21 |
| 4/5 | 1.20 |
| 5/6 | 1.21 |
| 6/7 | 1.33 |

| | Ratios | 1050 | 1052 | 1054 | 1056 | 1058 | 1060 |
|---|---|---|---|---|---|---|---|
| Reverse | -2.54 | | X | | | | X |
| Neutral | | | X | | | | |
| 1 | 2.10 | | X | | | X | |
| 2 | 1.40 | X | | | | X | |
| 3 | 1.00 | | | | X | X | |
| 4 | 0.70 | X | | | X | | |
| 5 | 0.63 | | | X | X | | |
| 6 | 0.54 | X | | | | X | |
| 7 | 0.39 | | X | | X | | |

(X = engaged)

Ring Gear/Sun Gear Tooth Ratio:  $\frac{R_1}{S_1} = 2.50, \frac{R_2}{S_2} = 1.74, \frac{R_3}{S_3} = 1.51$

| Ratio Spread | 5.41 |
|---|---|
| Ratio Steps | |
| Rev/1 | -1.21 |
| 1/2 | 1.50 |
| 2/3 | 1.40 |
| 3/4 | 1.43 |
| 4/5 | 1.11 |
| 5/6 | 1.16 |
| 6/7 | 1.40 |

| | Ratios | 1150 | 1152 | 1154 | 1156 | 1158 | 1160 |
|---|---|---|---|---|---|---|---|
| Reverse | -2.13 | | X | X | | | |
| Neutral | | | X | | | | |
| 1 | 2.15 | | X | | X | | |
| 2 | 1.33 | | X | | | X | |
| 3 | 1.00 | | X | | | | X |
| 4 | 0.60 | X | X | | | | |
| 5 | 0.54 | X | | | | | X |
| 6 | 0.49 | X | | | | X | |
| 7 | 0.37 | X | | | X | | |

(X = engaged)

Ring Gear/Sun Gear Tooth Ratio: $\frac{R_1}{S_1}=1.74, \frac{R_2}{S_2}=1.54, \frac{R_3}{S_3}=1.80$

| Ratio Spread | 5.90 |
|---|---|
| Ratio Steps | |
| Rev/1 | -0.99 |
| 1/2 | 1.62 |
| 2/3 | 1.33 |
| 3/4 | 1.68 |
| 4/5 | 1.11 |
| 5/6 | 1.10 |
| 6/7 | 1.33 |

|  | Ratios | 1250 | 1252 | 1254 | 1256 | 1258 | 1260 |
|---|---|---|---|---|---|---|---|
| Reverse | -3.74 | X |  |  | X |  |  |
| Neutral |  |  |  |  | X |  |  |
| 1 | 9.18 |  | X |  | X |  |  |
| 2 | 4.02 |  | X |  |  |  | X |
| 3 | 2.72 |  | X |  |  | X |  |
| 4 | 2.12 |  | X | X |  |  |  |
| 5 | 1.69 | X | X |  |  |  |  |
| 6 | 1.39 | X |  | X |  |  |  |
| 7 | 0.94 | X |  |  |  | X |  |

(*X = engaged*)

*Ring Gear/Sun Gear Tooth Ratio:* $\quad \frac{R_1}{S_1}=1.89, \frac{R_2}{S_2}=1.83, \frac{R_3}{S_3}=1.72$

| Ratio Spread | 9.73 |
|---|---|
| Ratio Steps |  |
| Rev/1 | -0.41 |
| 1/2 | 2.28 |
| 2/3 | 1.48 |
| 3/4 | 1.29 |
| 4/5 | 1.25 |
| 5/6 | 1.22 |
| 6/7 | 1.47 |

|  | Ratios | 1350 | 1352 | 1354 | 1356 | 1358 | 1360 |
|---|---|---|---|---|---|---|---|
| Reverse | -2.91 | X |  |  |  | X |  |
| Neutral |  |  |  |  |  | X |  |
| 1 | 6.93 |  |  |  | X | X |  |
| 2 | 3.92 |  |  |  | X |  | X |
| 3 | 2.89 |  |  |  | X | X |  |
| 4 | 1.93 |  | X | X |  |  |  |
| 5 | 1.75 |  | X |  | X |  |  |
| 6 | 1.56 |  | X |  |  |  | X |
| 7 | 1.00 |  | X |  |  | X |  |

*(X = engaged)*

Ring Gear/Sun Gear Tooth Ratio: $\frac{R_1}{S_1}=1.52, \frac{R_2}{S_2}=2.83, \frac{R_3}{S_3}=2.92$

| Ratio Spread | 6.93 |
|---|---|
| Ratio Steps |  |
| Rev/1 | -0.42 |
| 1/2 | 1.77 |
| 2/3 | 1.36 |
| 3/4 | 1.50 |
| 4/5 | 1.10 |
| 5/6 | 1.12 |
| 6/7 | 1.56 |

|  | Ratios | 1450 | 1452 | 1454 | 1456 | 1458 | 1460 |
|---|---|---|---|---|---|---|---|
| Reverse | -2.67 | X |  |  |  | X |  |
| Neutral |  |  |  |  |  | X |  |
| 1 | 6.52 |  | X |  |  | X |  |
| 2 | 3.94 |  | X |  |  |  | X |
| 3 | 2.98 |  | X |  | X |  |  |
| 4 | 2.01 |  | X | X |  |  |  |
| 5 | 1.79 |  |  | X | X |  |  |
| 6 | 1.57 |  |  | X |  |  | X |
| 7 | 1.00 |  |  | X |  | X |  |

(X = engaged)

Ring Gear/Sun Gear Tooth Ratio: $\frac{R_1}{S_1}=2.67, \frac{R_2}{S_2}=1.50, \frac{R_3}{S_3}=1.74$

| Ratio Spread | 6.52 |
|---|---|
| Ratio Steps |  |
| Rev/1 | -0.41 |
| 1/2 | 1.65 |
| 2/3 | 1.32 |
| 3/4 | 1.48 |
| 4/5 | 1.12 |
| 5/6 | 1.14 |
| 6/7 | 1.57 |

| | Ratios | 1550 | 1552 | 1554 | 1556 | 1558 | 1560 |
|---|---|---|---|---|---|---|---|
| Reverse | -8.80 | | | X | | | X |
| Neutral | | | | X | | | |
| 1 | 7.44 | | | X | X | | |
| 2 | 4.66 | X | | | X | | |
| 3 | 3.04 | | X | | X | | |
| 4 | 2.03 | X | X | | | | |
| 5 | 1.84 | | X | | | X | |
| 6 | 1.53 | X | | | | X | |
| 7 | 1.00 | | | | X | X | |

*(X = engaged)*

*Ring Gear/Sun Gear Tooth Ratio:* $\frac{R_1}{S_1}=1.72, \frac{R_2}{S_2}=1.89, \frac{R_3}{S_3}=2.15$

| Ratio Spread | 7.44 |
|---|---|
| Ratio Steps | |
| Rev/1 | -1.18 |
| 1/2 | 1.60 |
| 2/3 | 1.53 |
| 3/4 | 1.50 |
| 4/5 | 1.11 |
| 5/6 | 1.20 |
| 6/7 | 1.53 |

FAMILY OF MULTI-SPEED PLANETARY TRANSMISSION MECHANISMS HAVING CLUTCH INPUT

TECHNICAL FIELD

This invention relates to power transmissions and, more particularly, to power transmissions having three planetary gearsets and six torque-transmitting mechanisms in order to provide at least seven forward speed ratios and one reverse speed ratio.

BACKGROUND OF THE INVENTION

Automatic shifting power transmissions are currently used in a majority of the vehicles produced in the United States. These vehicles generally employ three- and four-speed power transmissions. More recently, a trend towards more ratios, such as five- and six-speed power transmissions, has been proposed. In fact, some manufacturers do provide five-speed transmissions. Many of the vehicles utilizing manual type transmissions or countershaft type transmissions employ five- and six-speed power transmissions.

The five- and six-speed power transmissions provide improved vehicle acceleration performance and fuel economy when compared with three- and four-speed transmissions. Seven-speed transmissions offer further vehicle acceleration performance and fuel economy improvements over five- and six-speed power transmissions. However, seven-speed power transmissions have not been proposed due to the complexity of these assemblies, as well as size and cost. There are many current patents that describe five- and six-speed power transmissions. Some of the six-speed power transmission patents, especially those assigned to the assignee of the present invention, describe six-speed power transmissions in families, wherein one or more family members incorporate a seven-speed power transmission.

SUMMARY OF THE INVENTION

It is an object of the present invention to provide an improved family of seven-speed power transmissions incorporating three planetary gearsets and six torque-transmitting mechanisms.

In one aspect of the present invention, the six torque-transmitting mechanisms are engaged in combinations of two to establish at least seven forward speed ratios and one reverse speed ratio within the planetary gearsets.

In another aspect of the present invention, an interconnecting member continuously interconnects a first member of the first planetary gearset and a first member of the second planetary gearset.

In still another aspect of the present invention, a second interconnecting member continuously interconnects a second member of the first planetary gearset with a first member of the third planetary gearset.

In yet another aspect of the present invention, a third interconnecting member continuously interconnects a second member of the second planetary gearset with a second member of the third planetary gearset.

In yet still another aspect of the present invention, a third member of the first planetary gearset is continuously interconnected with a stationary member, such as a transmission case or housing.

In a yet still another aspect of the present invention, an output shaft is continuously interconnected with at least one member of one of the planetary gearsets.

In yet still another aspect of the present invention an input shaft is not continuously connected with any of the planetary gear sets but rather only selectively connectible therewith through selectively engageable torque transmitting mechanisms.

In a further aspect of the present invention, a first of the torque-transmitting mechanisms selectively interconnects an input shaft with a member of one of the planetary gearsets.

In a still further aspect of the present invention, a second of the torque-transmitting mechanisms selectively interconnects the input shaft with a member of one of the planetary gearsets not interconnected with the first torque-transmitting mechanism.

In yet a further aspect of the present invention, a third of the torque-transmitting mechanisms selectively interconnects a member of one of the-planetary gearsets or one of the interconnecting members with either the input shaft, the output shaft, or another member of one of the planetary gearsets.

In a yet still further aspect of the present invention, a fourth of the torque-transmitting mechanisms selectively interconnects a member of one of the planetary gearsets with either the input shaft, the output shaft, or another member of one of the planetary gearsets.

In a still further aspect of the present invention, a fifth of the torque-transmitting mechanisms selectively interconnects at least one member of one of the planetary gearsets with another member of the first, second, or third planetary gearset, or with the transmission housing.

In a further aspect of the present invention, a sixth of the torque-transmitting mechanisms selectively interconnects a member of one of the planetary gearsets with either the output shaft, another member of one of the planetary gearsets, or with the transmission housing.

In a yet further aspect of the present invention, each of the members of the planetary gearsets can be either a sun gear member, a ring gear member, or a planet carrier assembly member, and each of the planet carrier assembly members can be either of the single pinion type or of the double pinion type.

DESCRIPTION OF THE EXEMPLARY EMBODIMENTS

Figures 1, 2:
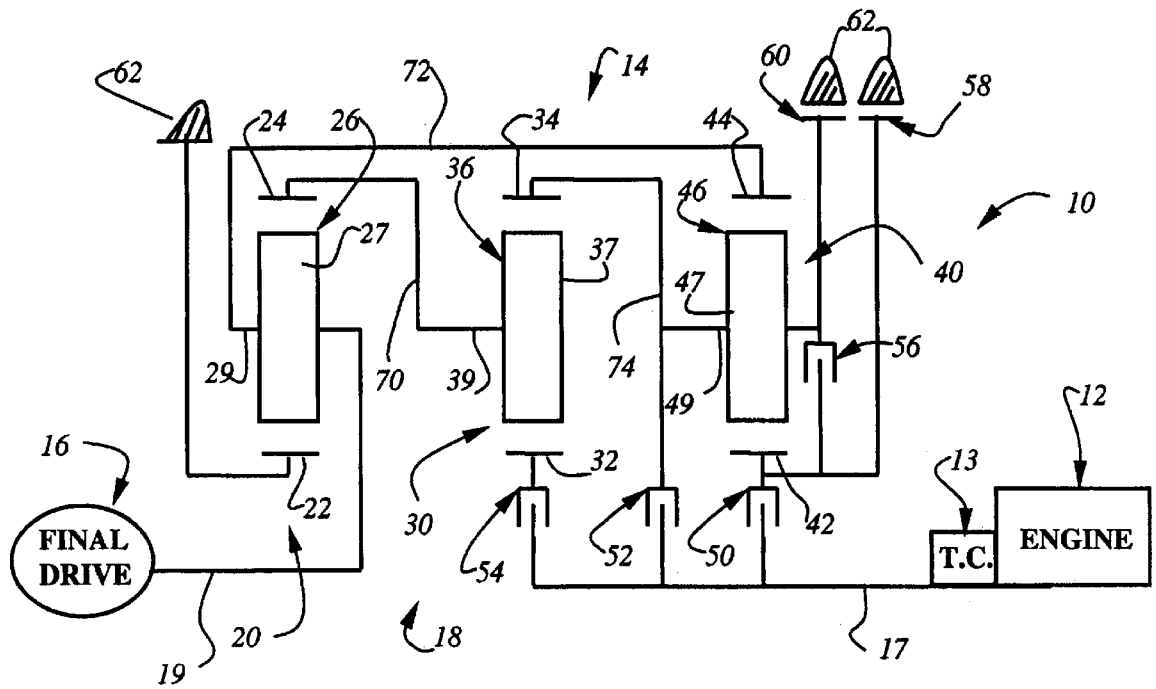
FIG. 1 is a schematic representation of a powertrain having one embodiment of the present invention incorporated therein.
FIG. 2 is a truth table and chart depicting some of the operating parameters of the powertrain shown in FIG. 1.

Referring to the drawings, wherein like characters represent the same or corresponding parts throughout the several views, there is seen in FIG. 1 a powertrain 10 having a conventional engine or prime mover 12, a conventional starting device 13, a planetary transmission 14, and a conventional final drive mechanism 16. The starting device 13 may be a mechanism, such as a torque converter, a fluid coupling, or a starting clutch. The final drive mechanism 16 is a conventional differential type mechanism, which is drivingly connected with the drive wheels of a vehicle, not shown.

The planetary transmission 14 includes an input shaft 17, a planetary gear arrangement 18, and an output shaft 19. The input shaft 17 is continuously connected with the starting device 13 or with the engine 12. The output shaft 19 is continuously interconnected with the final drive mechanism 16.

The planetary gear arrangement 18 includes a planetary gearset 20 having a sun gear member 22, a ring gear member 24, and a planet carrier assembly member 26. The planet carrier assembly member 26 includes a plurality of pinion gears 27 rotatably mounted on a planet carrier member 29 and disposed in meshing relationship with the sun gear member 22 and the ring gear member 24.

The planetary gear arrangement 18 also includes a planetary gearset 30 having a sun gear member 32, a ring gear member 34, and a planet carrier assembly member 36. The planet carrier assembly member 36 includes a plurality of pinion gears 37 rotatably mounted on a planet carrier member 39 and disposed in meshing relationship with the sun gear member 32 and the ring gear member 34.

The planetary gear arrangement 18 further includes a third planetary gearset 40 having a sun gear member 42, a ring gear member 44, and a planet carrier assembly member 46. The planet carrier assembly member 46 includes a plurality of pinion gears 47 rotatably mounted on a planet carrier member 49 and disposed in meshing relationship with the sun gear member 42 and the ring gear member 44.

Also included in the planetary gear arrangement 18 are six torque-transmitting mechanisms 50, 52, 54, 56, 58, and 60. The torque-transmitting mechanisms 50, 52, 54, and 56 are conventional rotating type torque-transmitting mechanisms, commonly termed clutches. These devices, as well known, are multiple type friction devices having a fluid-operated apply piston. The torque-transmitting mechanisms 58 and 60 are conventional stationary type torque-transmitting mechanisms, commonly termed brakes. Each of these stationary type torque-transmitting mechanisms can be either a disc type brake a band type brake. Both constructions are well known to those skilled in the art.

The ring gear member 24 and the planet carrier assembly member 36 are continuously interconnected by an interconnecting member 70. The planet carrier assembly member 26 and the ring gear member 44 are continuously interconnected by an interconnecting member 72. The ring gear member 34 and the planet carrier assembly member 46 are continuously interconnected by an interconnecting member 74. The planet carrier assembly member 26 is continuously connected with the output shaft 19

The input shaft 17 is selectively connectible with the sun gear member 42 through the torque-transmitting mechanism 50, selectively connectible with the interconnecting member 74 through the torque-transmitting mechanism 52, and selectively connectible with the sun gear member 32 through the torque-transmitting mechanism 54. The sun gear member 22 is continuously connected with the transmission housing 62. The sun gear member 42 is selectively interconnectible with the planet carrier assembly member 46 through the torque-transmitting mechanism 56, and selectively connectible with the transmission housing 62 through the torque-transmitting mechanism 58. The planet carrier assembly member 46 and therefore interconnecting member 74 are selectively connectible with the transmission housing 62 through the torque-transmitting mechanism 60.

Each of these interconnecting descriptions refer to the planet carrier assembly members being interconnected, however, as is well known, the input and output member of the planet carrier assembly member is the planet carrier member itself. For example, with the planet carrier assembly member 26, any interconnections are made through the planet carrier member 29.

The truth table shown in FIG. 2 describes the engagement combinations and sequence for the torque-transmitting mechanisms in order to establish seven forward speed ratios and one reverse speed ratio in the planetary gear arrangement 18 between the input shaft 17 and the output shaft 19. As can be seen in the truth table, the torque-transmitting mechanisms are engaged in combinations of two for each of the speed ratios. Also, it should be recognized from the truth table that all of the single step interchanges in the forward direction are of the single transition variety as is the reverse-to-first forward speed ratio interchange when the torque-transmitting mechanism 60 remains engaged through a neutral condition. Further information given in the truth table is a numerical example for each of the forward speed ratios as well as the reverse speed ratio. The numerical values are determined utilizing the ring gear/sun gear tooth ratios of the planetary gearsets 20, 30, and 40 when the ring gear/sun gear tooth ratios are as defined in R1/S1, R2/S2, and R3/S3. The planetary gear arrangement is not limited to the particular gear ratios shown, or to the particular tooth ratio shown. Those skilled in the art will recognize that in order to modify the overall ratio spread or the step ratio between adjacent forward speed ratios, it is possible to change the ring gear/sun gear tooth ratios. A chart in FIG. 2 provides the numerical value for the ratio steps between adjacent forward speed ratios as well as between the reverse and first forward speed ratio. Other information given in the chart is the numerical value of the overall ratio spread of the forward speed ratios.

The reverse speed ratio is established with the engagement of the torque-transmitting mechanisms 50 and 60. During the reverse speed ratio, the ring gear member 44 and therefore output shaft 19 are rotated at a speed determined by the speed of the sun gear member 42 and the ring gear/sun gear tooth ratio of the planetary gearset 40. The numerical value of the reverse speed ratio is determined by the ring gear/sun gear tooth ratio of the planetary gearset 40.

The first forward speed ratio is established with the engagement of the torque-transmitting mechanisms 54 and 60. During the first forward speed ratio, the planet carrier assembly member 36 and ring gear member 24 are rotated at a speed determined by the speed of the sun gear member 32 and the ring gear/sun gear tooth ratio of the planetary gearset 30. The planet carrier assembly member 26 and therefore output shaft 19 are rotated at a speed determined by the speed of the ring gear member 24 and the ring gear/sun gear tooth ratio of the planetary gearset 20. The numerical value of the first forward speed ratio is determined by the ring gear/sun gear tooth ratios of the planetary gearsets 20 and 30.

The second forward speed ratio is established with the engagement of the torque-transmitting mechanisms 54 and 58. During the second forward speed ratio, the planet carrier assembly member 46 and ring gear member 34 are rotated at a speed determined by the speed of the ring gear member 44 and the ring gear/sun gear tooth ratio of the planetary gearset 40. The planet carrier assembly member 36 and ring gear member 24 are rotated at a speed determined by the speed of the sun gear member 32, the speed of the ring gear member 34, and the ring gear/sun gear tooth ratio of the planetary gearset 30. The planet carrier assembly member 26 and therefore output shaft 19 are rotated at a speed determined by the speed of the ring gear member 24 and the ring gear/sun gear tooth ratio of the planetary gearset 20. The numerical value of the second forward speed ratio is determined by the ring gear/sun gear tooth ratios of all three planetary gearsets 20, 30, and 40.

The third forward speed ratio is established with the engagement of the torque-transmitting mechanisms 54 and 56. During the third forward speed ratio, the planetary gearset 40 and the ring gear member 34 rotate in unison. The planet carrier assembly member 36 and ring gear member 24 are rotated at a speed determined by the speed of the sun gear member 32, the speed of the ring gear member 34, and the ring gear/sun gear tooth ratio 30. The planet carrier assembly member 26, ring gear member 44, and ring gear member 34 are rotated at a speed determined by the speed of the ring gear member 24 and the ring gear/sun gear tooth ratio of the planetary gearset 20. The numerical value of the third forward speed ratio is determined by the ring gear/sun gear tooth ratios of the planetary gearsets 20 and 30.

The fourth forward speed ratio is established with the engagement of the torque-transmitting mechanisms 50 and 54. During the fourth forward speed ratio, the planet carrier assembly member 46 and ring gear member 34 are rotated at a speed determined by the speed of the sun gear member 42, the speed of the ring gear member 44, and the ring gear/sun gear tooth ratio of the planetary gearset 40. The planet carrier assembly member 36 and ring gear member 24 are rotated at a speed determined by the speed of the sun gear member 32, the speed of the ring gear member 34, and the ring gear/sun gear tooth ratio of the planetary gearset 30. The interconnecting member 72 and the output shaft 19 are rotated at a speed determined by the speed of the ring gear member 24 and the ring gear/sun gear tooth ratio of the planetary gearset 20. The numerical value of the fourth forward speed ratio is determined by the ring gear/sun gear tooth ratios of all three planetary gearsets 20, 30, and 40.

The fifth forward speed ratio is established with the engagement of the torque-transmitting mechanisms 52 and 54. During the fifth forward speed ratio, the planetary gearset 30 and ring gear member 24 rotate in unison with the input shaft 17. The planet carrier assembly member 26 and therefore output shaft 19 are rotated at a speed determined by the speed of the ring gear member 24 and the ring gear/sun gear tooth ratio of the planetary gearset 20. The numerical value of the fifth forward speed ratio is determined by the ring gear/sun gear tooth ratio of the planetary gearset 20.

The sixth forward speed ratio is established with the engagement of the torque-transmitting mechanisms 50 and 52. During the sixth forward speed ratio, the planetary gearset 40, the planet carrier assembly member 26 and therefore output shaft 19 rotate in unison with the input shaft 17. The numerical value of the sixth forward speed ratio is one.

The seventh forward speed ratio is established with the engagement of the torque-transmitting mechanisms 52 and 58. During the seventh forward speed ratio, the ring gear member 44, planet carrier assembly member 26 and therefore output shaft 19 are rotated at a speed determined by the speed of the planet carrier assembly member 46 and the ring gear/sun gear tooth ratio of the planetary gearset 40. The numerical value of the seventh forward speed ratio is determined by the ring gear/sun gear tooth ratio of the planetary gearset 40.

Figures 3, 4:
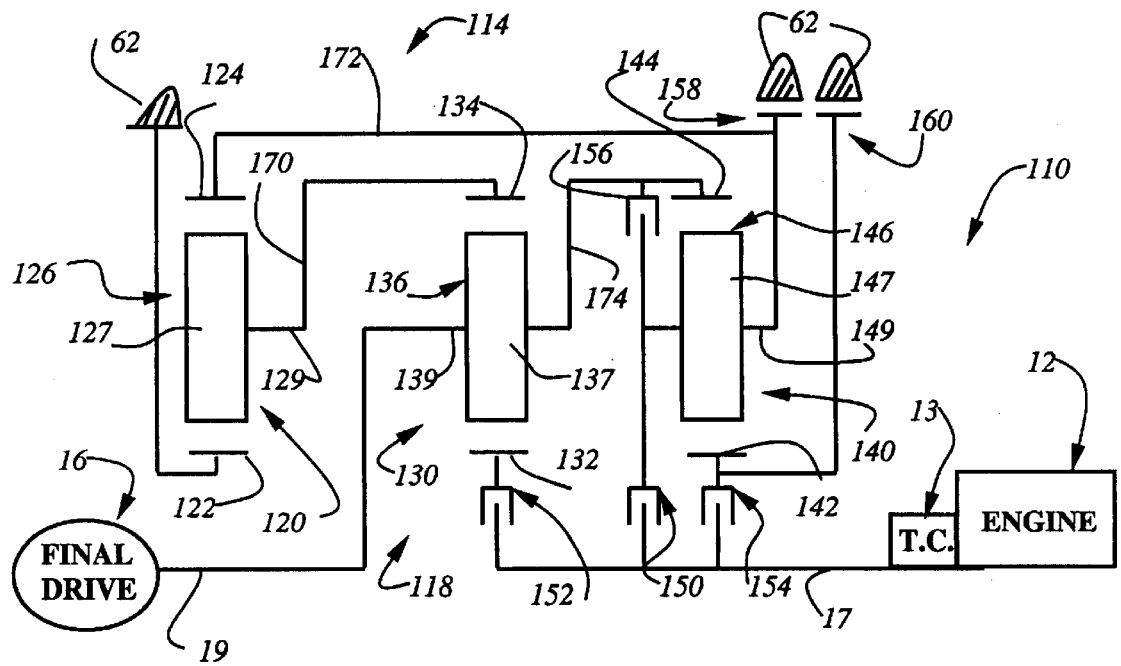
FIG. 3 is a schematic representation of a powertrain having another embodiment of the present invention incorporated therein.
FIG. 4 is a truth table and chart depicting some of the operating parameters of the embodiment shown in FIG. 3.

A powertrain 110, shown in FIG. 3, includes the engine 12, the starting device 13, a planetary transmission 114, and the final drive mechanism 16. The planetary transmission 114 includes the input shaft 17, a planetary gear arrangement 118, and the output shaft 19. The planetary gear arrangement 118 includes three planetary gearsets 120, 130, and 140, and six torque-transmitting mechanisms 150, 152, 154, 156, 158, and 160. The torque-transmitting mechanisms 158 and 160 are stationary type torque-transmitting mechanisms, while the remaining torque-transmitting mechanisms 150, 152, 154, and 156 are of the rotating type.

The planetary gearset 120 includes a sun gear member 122, a ring gear member 124, and a planet carrier assembly member 126. The planet carrier assembly member 126 includes a plurality of pinion gears 127 rotatably mounted on a planet carrier 129 and disposed in meshing relationship with the sun gear member 122 and the ring gear member 124.

The planetary gearset 130 includes a sun gear member 132, a ring gear member 134, and a planet carrier assembly member 136. The planet carrier assembly member 136 includes a plurality of pinion gears 137 rotatably mounted on a planet carrier 139 and disposed in meshing relationship with the sun gear member 132 and the ring gear member 134.

The planetary gearset 140 includes a sun gear member 142, a ring gear member 144, and a planet carrier assembly member 146. The planet carrier assembly member 146 includes a plurality of pinion gears 147 rotatably mounted on a planet carrier 149 and disposed in meshing relationship with the sun gear member 142 and the ring gear member 144.

The planet carrier assembly member 126 by way of its planet carrier member 129 is continuously interconnected with the ring gear member 134 through an interconnecting member 170. The ring gear member 124 is continuously interconnected with the planet carrier assembly member 146 through the planet carrier member 149 by an interconnecting member 172. The planet carrier assembly member 136, the ring gear member 144, and the output shaft 19 are all continuously interconnected by an interconnecting member 174. The sun gear member 122 is continuously connected with the transmission housing 62.

The input shaft 17 is selectively interconnectible with the interconnecting member 172 through the torque-transmitting mechanism 150, selectively interconnectible with the sun gear member 132 through the torque-transmitting mechanism 152, and selectively interconnectible with the sun gear member 142 through the torque-transmitting mechanism 154. The planet carrier assembly member 146 is selectively interconnectible with the interconnecting member 174 through the torque-transmitting mechanism 156, and selectively interconnectible with the transmission housing 62 through the torque-transmitting mechanism 158. The sun gear member 142 is selectively interconnectible with the transmission housing 62 through the torque-transmitting mechanism 160.

As seen in the truth table of FIG. 4, the planetary gear arrangement 118 is capable of providing seven forward speed ratios and one reverse speed ratio when the torque-transmitting mechanisms are engaged in combinations of two in the sequence shown. Also given in the truth table is a numerical example of the speed ratios that are available with the planetary gear arrangement 118 when the ring gear/sun gear tooth ratios of the planetary gearsets 120, 130, and 140 are as given in FIG. 4 as R1/S1, R2/S2, and R3/S3. Further information given in FIG. 4 is the numerical value for the ratio steps between adjacent forward speed ratios as well as between the reverse and first forward speed ratio. The chart in FIG. 4 also provides the numerical value for the overall ratio spread of the forward speed ratios.

The reverse speed ratio is established with the engagement of the torque-transmitting mechanisms 154 and 158. During the reverse speed ratio, the ring gear member 144 and therefore output shaft 19 are rotated at a speed determined by the speed of the sun gear member 142 and the ring gear/sun gear tooth ratio of the planetary gearset 140. The numerical value of the reverse speed ratio is determined by the ring gear/sun gear tooth ratio of the planetary gearset 140.

The first forward speed ratio is established with the engagement of the torque-transmitting mechanisms 152 and 158. During the first forward speed ratio, the planet carrier assembly member 136 and therefore output shaft 19 are rotated at a speed determined by the speed of the sun gear member 132 and the ring gear/sun gear tooth ratio of the planetary gearset 130. The numerical value of the first forward speed ratio is determined by the ring gear/sun gear tooth ratio of the planetary gearset 130.

The second forward speed ratio is established with the engagement of the torque-transmitting mechanisms 152 and 160. During the second forward speed ratio, the planet carrier assembly member 146 and ring gear member 124 are rotated at a speed determined by the speed of the ring gear member 144 and the ring gear/sun gear tooth ratio of the planetary gearset 140. The planet carrier assembly member 126 and ring gear member 134 are rotated at a speed determined by the speed of the ring gear member 124 and the ring gear/sun gear tooth ratio of the planetary gearset 120. The planet carrier assembly member 136 and therefore output shaft 19 are rotated at a speed determined by the speed of the sun gear member 132, the speed of the ring gear member 134, and the ring gear/sun gear tooth ratio of the planetary gearset 130. The numerical value of the second forward speed ratio is determined by the ring gear/sun gear tooth ratios of all three planetary gearsets 120, 130, and 140.

The third forward speed ratio is established with the engagement of the torque-transmitting mechanisms 152 and 156. During the third forward speed ratio, the planet carrier assembly member 126 and ring gear member 134 are rotated at a speed determined by the speed of the ring gear member 124 and the ring gear/sun gear tooth ratio of the planetary gearset 120. The planet carrier assembly member 136 and therefore output shaft 19 are rotated at a speed determined by the speed of the ring gear member 134, the speed of the sun gear member 132, and the ring gear/sun gear tooth ratio of the planetary gearset 130. The numerical value of the third forward speed ratio is determined by the ring gear/sun gear tooth ratios of the planetary gearsets 130 and 120.

The fourth forward speed ratio is established with the engagement of the torque-transmitting mechanisms 152 and 154. During the fourth forward speed ratio, the planet carrier assembly member 146 and ring gear member 124 are rotated at a speed determined by the speed of the sun gear member 142, the speed of the ring gear member 144, and the ring gear/sun gear tooth ratio of the planetary gearset 140. The planet carrier assembly member 126 and ring gear member 134 are rotated at a speed determined by the speed of the ring gear member 124 and the ring gear/sun gear tooth ratio of the planetary gearset 120. The planet carrier assembly member 136 and therefore output shaft 19 are rotated at a speed determined by the speed of the sun gear member 132, the speed of the ring gear member 134, and the ring gear/sun gear tooth ratio of the planetary gearset 130. The numerical value of the fourth forward speed ratio is determined by the ring gear/sun gear tooth ratios of all three planetary gearsets 120, 130, and 140.

The fifth forward speed ratio is established with the engagement of the torque-transmitting mechanisms 150 and 152. During the fifth forward speed ratio, the planet carrier assembly member 126 and ring gear member 134 are rotated at a speed determined by the speed of the ring gear member 124 and the ring gear/sun gear tooth ratio of the planetary gearset 120. The planet carrier assembly member 136 and therefore output shaft 19 are rotated at a speed determined by the speed of the ring gear member 134, the speed of the sun gear member 132, and the ring gear/sun gear tooth ratio of the planetary gearset 130. The numerical value of the fifth forward speed ratio is determined by the ring gear/sun gear tooth ratios of the planetary gearsets 120 and 130.

The sixth forward speed ratio is established with the engagement of the torque-transmitting mechanisms 150 and 154. During the sixth forward speed ratio, the planetary gearset 140, planet carrier assembly member 136, and output shaft 19, are rotated in unison with the input shaft 17. The numerical value for the sixth forward speed ratio is one.

The seventh forward speed ratio is established with the engagement of the torque-transmitting mechanisms 150 and 160. During the seventh forward speed ratio, the ring gear member 144, planet carrier assembly member 136, and output shaft 19 are rotated at a speed determined by the speed of the planet carrier assembly member 146 and the ring gear/sun gear tooth ratio of the planetary gearset 140. The numerical value of the seventh forward speed ratio is determined by the ring gear/sun gear tooth ratio of the planetary gearset 140.

Figures 5, 6:
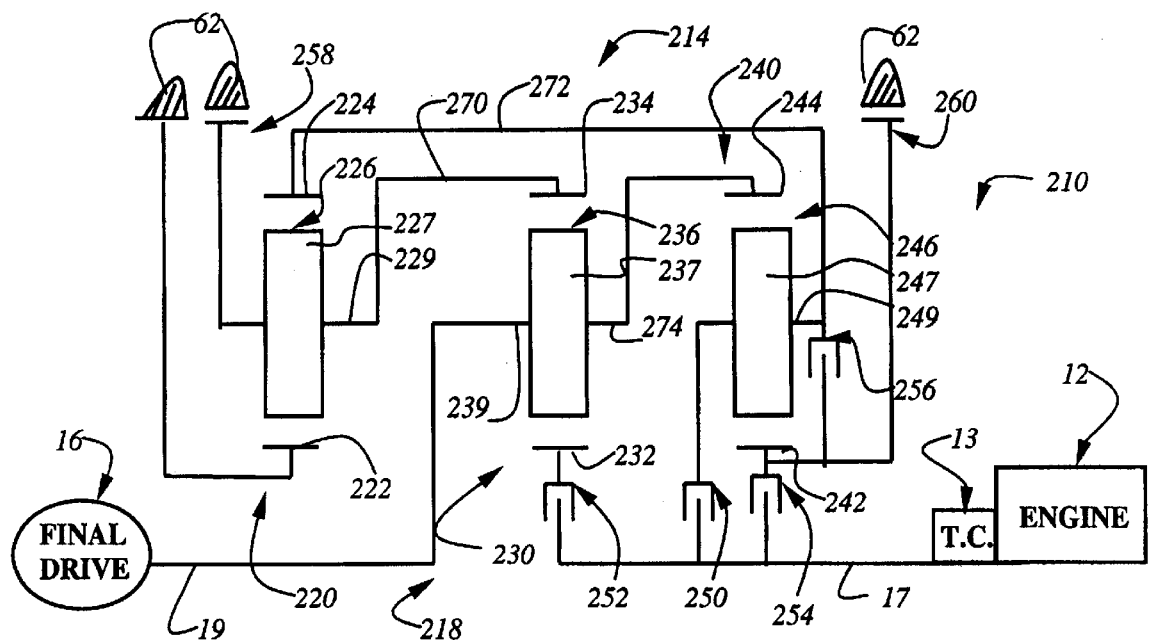
FIG. 5 is a schematic representation of a powertrain having another embodiment of the present invention incorporated therein.
FIG. 6 is a truth table and chart depicting some of the operating parameters of the embodiment shown in FIG. 5.

A powertrain 210, shown in FIG. 5, includes the engine 12, the starting device 13, a planetary transmission 214, and the final drive mechanism 16. The planetary transmission 214 includes the input shaft 17, a planetary gear arrangement 218, and the output shaft 19. The planetary gear arrangement 218 includes three planetary gearsets 220, 230, and 240, four rotating type torque-transmitting mechanisms 250, 252, 254, and 256, and two stationary type torque-transmitting mechanisms 258, and 260.

The planetary gearset 220 includes a sun gear member 222, a ring gear member 224, and a planet carrier assembly member 226. The planet carrier assembly member 226 includes a plurality of pinion gears 227 rotatably mounted on a planet carrier 229 and disposed in meshing relationship with the sun gear member 222 and the ring gear member 224.

The planetary gearset 230 includes a sun gear member 232, a ring gear member 234, and a planet carrier assembly member 236. The planet carrier assembly member 236 includes a plurality of pinion gears 237 rotatably mounted on a planet carrier 239 and disposed in meshing relationship with the sun gear member 232 and the ring gear member 234.

The planetary gearset 240 includes a sun gear member 242, a ring gear member 244, and a planet carrier assembly member 246. The planet carrier assembly member 246 includes a plurality of pinion gears 247 rotatably mounted on a planet carrier 249 and disposed in meshing relationship with the sun gear member 242 and the ring gear member 244.

The planet carrier assembly member 226 through its planet carrier member 229 is continuously interconnected with the ring gear member 234 through an interconnecting member 270. The ring gear member 224 is interconnected with the planet carrier assembly member 246 through an interconnecting member 272. The ring gear member 244, planet carrier assembly member 236, and the output shaft 19 are continuously interconnected by an interconnecting member 274. The sun gear member 222 is continuously connected with the transmission housing 62.

The input shaft 17 is selectively interconnectible with the interconnecting member 272 through the torque-transmitting mechanism 250, selectively connectible with the sun gear member 232 through the torque-transmitting mechanism 252, and selectively interconnectible with the sun gear member 242 through the torque-transmitting mechanism 254. The sun gear member 242 is selectively interconnectible with the interconnecting member 272 through the torque-transmitting mechanism 256. The interconnecting member 270 is selectively connectible with the transmission housing 62 through the torque-transmitting mechanism 258. The sun gear member 242 is selectively interconnectible with the transmission housing 62 through the torque-transmitting mechanism 260.

The truth table of FIG. 6 describes the engagement combinations and sequence for the torque-transmitting mechanisms in order to establish seven forward speed ratio and one reverse speed ratio in the planetary gear arrangement 218 between the input shaft 17 and the output shaft 19 in the planetary transmission 214. The truth table also provides an example of the numerical values of the speed ratios of the planetary gear arrangement 218. A chart in FIG. 6 provides the numerical examples for the ratio steps between adjacent forward speed ratios as well as between the reverse and first forward speed ratio when the speed ratios given in the truth table are employed. Also given in the chart of FIG. 6 is the overall ratio spread of the forward speed ratios. The numerical values given in the truth table are determined by the ring gear/sun gear tooth ratios of the planetary gearsets 220, 230, and 240 displayed in FIG. 6 as R1/S1, R2/S2, and R3/S3, respectively.

The reverse speed ratio is established with the engagement of the torque-transmitting mechanism 254 and 258. During the reverse speed ratio, the ring gear member 244 and therefore output shaft are rotated at a speed determined by the speed of the sun gear member 242 and the ring gear/sun gear tooth ratio of the planetary gearset 240. The numerical value of the reverse speed ratio is determined by the ring gear/sun gear tooth ratio of the planetary gearset 240.

The first forward speed ratio is established with the engagement of the torque-transmitting mechanisms 252 and 258. During the first forward speed ratio, the planet carrier assembly member 236 and therefore output shaft 19 are rotated at a speed determined by the speed of the sun gear member 232 and the ring gear/sun gear tooth ratio of the planetary gearset 230. The numerical value of the first forward speed ratio is determined by the ring gear/sun gear tooth ratio of the planetary gearset 230.

The second forward speed ratio is established with the engagement of the torque-transmitting mechanisms 252 and 260. During the second forward speed ratio, the planet carrier assembly member 246 and ring gear member 224 are rotated at a speed determined by the speed of the ring gear member 244 and the ring gear/sun gear tooth ratio of the planetary gearset 240. The planet carrier assembly member 226 and ring gear member 234 are rotated at a speed determined by the speed of the ring gear member 224 and the ring gear/sun gear tooth ratio of the planetary gearset 220. The planet carrier assembly member 236 and therefore output shaft 19 are rotated at a speed determined by the speed of the sun gear member 232, the speed of the ring gear member 234, and the ring gear/sun gear tooth ratio of the planetary gearset 230. The numerical value of the second forward speed ratio is determined by the ring gear/sun gear tooth ratios of all three planetary gearsets 220, 230, and 240.

The third forward speed ratio is established with the engagement of the torque-transmitting mechanisms 252 and 256. During the third forward speed ratio, the planet carrier assembly member 226 and ring gear member 234 are rotated at a speed determined by the speed of the ring gear member 224 and the ring gear/sun gear tooth ratio of the planetary gearset 220. The planet carrier assembly member 236 and therefore output shaft 19 are rotated at a speed determined by the speed of the sun gear member 232, the speed of the ring gear member 234, and the ring gear/sun gear tooth ratio of the planetary gearset 230. It should be noted that during the third forward speed ratio, the ring gear member 224, the planetary gearset 240, and the planet carrier assembly member 236 are rotated in unison. The numerical value of the third forward speed ratio is determined by the ring gear/sun gear tooth ratios of the planetary gearsets 220 and 230.

The fourth forward speed ratio is established with the engagement of the torque-transmitting mechanisms 252 and 254. During the fourth forward speed ratio, the planet carrier assembly member 246 and ring gear member 224 are rotated at a speed determined by the speed of the sun gear member 242, the speed of the ring gear member 244, and the ring gear/sun gear tooth ratio of the planetary gearset 240. The planet carrier assembly member 226 and ring gear member 234 are rotated at a speed determined by the speed of the ring gear member 224 and the ring gear/sun gear tooth ratio of the planetary gearset 220. The planet carrier assembly member 236 and therefore output shaft 19 are rotated at a speed determined by the speed of the ring gear member 234, the speed of the sun gear member 232, and the ring gear/sun gear tooth ratio of the planetary gearset 230. The numerical value of the fourth forward speed ratio is determined by the ring gear/sun gear tooth ratios of all three planetary gearsets 220, 230, and 240.

The fifth forward speed ratio is established with the engagement of the torque-transmitting mechanisms 250 and 252. During the fifth forward speed ratio, the planet carrier assembly member 226 and ring gear member 234 are rotated at a speed determined by the speed of the ring gear member 224 and the ring gear/sun gear tooth ratio of the planetary gearset 220. The planet carrier assembly member 236 and therefore output shaft 19 are rotated at a speed determined by the speed of the ring gear member 234, the speed of the sun gear member 232, and the ring gear/sun gear tooth ratio of the planetary gearset 230. The numerical value of the fifth forward speed ratio is determined by the ring gear/sun gear tooth ratios of the planetary gearsets 220 and 230.

The sixth forward speed ratio is established with the engagement of the torque-transmitting mechanisms 250 and 254. During the sixth forward speed ratio, the planetary gearset 240, planet carrier assembly member 236, and the output shaft 19, are rotated in unison with the input shaft 17. The numerical value of the sixth forward speed ratio is one.

The seventh forward speed ratio is established with the engagement of the torque-transmitting mechanisms 250 and 260. During the seventh forward speed ratio, the ring gear member 244 and therefore output shaft 19 are rotated at a speed determined by the speed of the planet carrier assembly member 246 and the ring gear/sun gear tooth ratio of the planetary gearset 240. The numerical value of the seventh forward speed ratio is determined by the ring gear/sun gear tooth ratio of the planetary gearset 240.

Figures 7, 8:
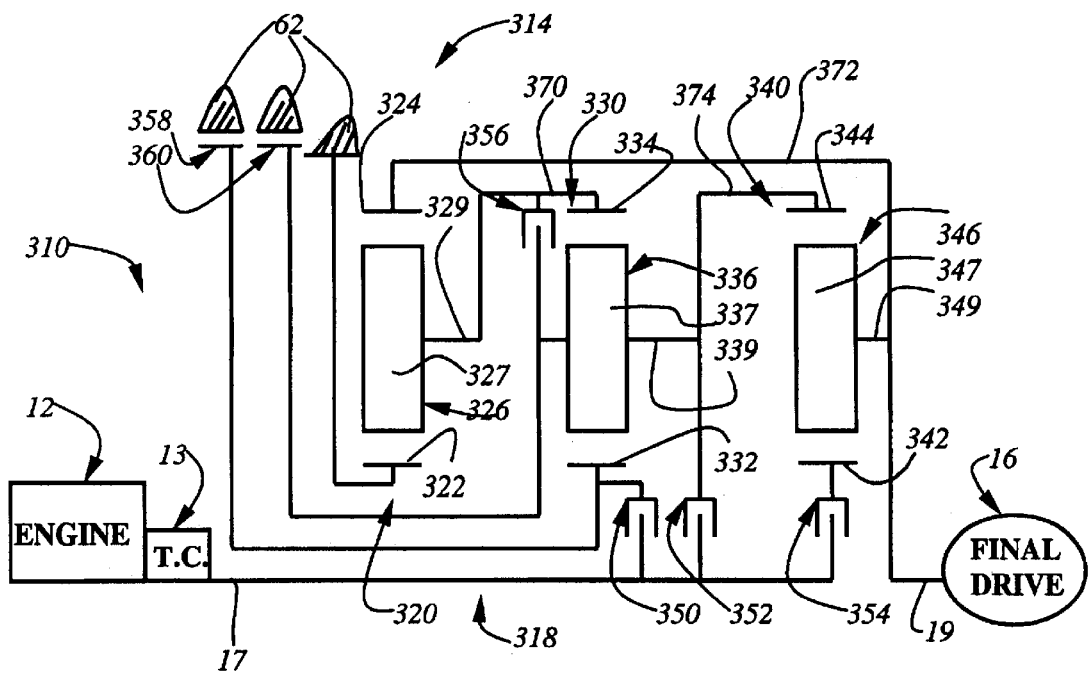
FIG. 7 is a schematic representation of a powertrain having another embodiment of the present invention incorporated therein.
FIG. 8 is a truth table and chart depicting some of the operating parameters of the embodiment shown in FIG. 7.

A powertrain 310, shown in FIG. 7, includes the engine 12, the starting device 13, a planetary transmission 314, and the final drive mechanism 16. The planetary transmission 314 includes the input shaft 17, a planetary gear arrangement 318, and the output shaft 19. The planetary gear arrangement 318 includes three planetary gearsets 320, 330, and 340, four rotating type torque-transmitting mechanisms 350, 352, 354, and 356, and two stationary type torque-transmitting mechanisms 358, and 360.

The planetary gearset 320 includes a sun gear member 322, a ring gear member 324, and a planet carrier assembly member 326. The planet carrier assembly member 326 includes a plurality of pinion gears 327 rotatably mounted on a planet carrier 329 and disposed in meshing relationship with the sun gear member 322 and the ring gear member 324.

The planetary gearset 330 includes a sun gear member 332, a ring gear member 334, and a planet carrier assembly member 336. The planet carrier assembly member 336 includes a plurality of pinion gears 337 rotatably mounted on a planet carrier 339 and disposed in meshing relationship with the sun gear member 332 and the ring gear member 334.

The planetary gearset 340 includes a sun gear member 342, a ring gear member 344, and a planet carrier assembly member 346. The planet carrier assembly member 346 includes a plurality of pinion gears 347 rotatably mounted on a planet carrier 349 and disposed in meshing relationship with the sun gear member 342 and the ring gear member 344.

The planet carrier assembly member 326 is continuously interconnected with the ring gear member 334 through an interconnecting member 370. The ring gear member 324, planet carrier assembly member 346, and the output shaft 19 are continuously interconnected by an interconnecting member 372. The planet carrier assembly member 336 and ring gear member 344 are continuously interconnected by an interconnecting member 374. The sun gear member 322 is continuously connected with the transmission housing 62.

The input shaft 17 is selectively connectible with the sun gear member 332 through the torque-transmitting mechanism 350, selectively interconnectible with the interconnecting member 374 through the torque-transmitting mechanism 352, and selectively interconnectible with the sun gear member 342 through the torque-transmitting mechanism 354. The interconnecting member 370 is selectively interconnectible with the interconnecting member 374 through the torque-transmitting mechanism 356. The interconnecting member 374 is selectively interconnectible with the transmission housing 62 through the torque-transmitting mechanism 360. The sun gear member 332 is selectively interconnectible with transmission housing 62 through the torque-transmitting mechanism 358.

As seen in the truth table of FIG. 8, the torque-transmitting mechanisms are selectively engaged in combinations of two to provide seven forward speed ratios and one reverse speed ratio in the planetary gear arrangement 318.

Also given in the truth table is a numerical example of the speed ratios that are available with the planetary gear arrangement 318 when the ring gear/sun gear tooth ratios of the planetary gearsets 320, 330, and 340 are as defined as R1/S1, R2/S2, and R3/S3, respectively. Further information given in FIG. 8 by way of a chart that provides numerical values for the ratio steps between adjacent forward speed ratios as well as between reverse and first forward speed ratio. Also given in the chart of FIG. 8 is the numerical value of the overall ratio spread of the forward speed ratios.

The reverse speed ratio is established with the engagement of the torque-transmitting mechanisms 350 and 360. During the reverse speed ratio, the ring gear member 334 and planet carrier assembly member 326 are rotated at a speed determined by the speed of the sun gear member 332 and the ring gear/sun gear tooth ratio of the planetary gearset 330. The ring gear member 324, planet carrier assembly member 346, and output shaft 19 are rotated at a speed determined by the speed of the planet carrier assembly member 326 and the ring gear/sun gear tooth ratio of the planetary gearset 320. The numerical value of the reverse speed ratio is determined by the ring gear/sun gear tooth ratios of the planetary gearsets 320 and 330.

The first forward speed ratio is established with the engagement of the torque-transmitting mechanisms 354 and 360. During the first forward speed ratio, the planet carrier assembly member 346 and therefore output shaft 19 are rotated at a speed determined by the speed of the sun gear member 342 and the ring gear/sun gear tooth ratio of the planetary gearset 340. The numerical value of the first forward speed ratio is determined by the ring gear/sun gear tooth ratio of the planetary gearset 340.

The second forward speed ratio is established with the engagement of the torque-transmitting mechanisms 354 and 358. During the second forward speed ratio, the ring gear member 344 and planet carrier assembly member 336 are rotated at a speed determined by the speed of the sun gear member 342, the speed of the planet carrier assembly member 346, and the ring gear/sun gear tooth ratio of the planetary gearset 340. The ring gear member 334 and planet carrier assembly member 326 are rotated at a speed determined by the speed of the planet carrier assembly member 336 and the ring gear/sun gear tooth ratio of the planetary gearset 330. The ring gear member 324, planet carrier assembly member 346, and output shaft 19 are rotated at a speed determined by the speed of the planet carrier assembly member 326 and the ring gear/sun gear tooth ratio of the planetary gearset 320. The numerical value of the second forward speed ratio is determined by the ring gear/sun gear tooth ratios of all three planetary gearsets 320, 330, and 340.

The third forward speed ratio is established with the engagement of the torque-transmitting mechanisms 354 and 356. During the third forward speed ratio the ring gear member 344, ring gear member 334, and planet carrier assembly member 326 are rotated at a speed determined by the speed of the sun gear member 342, the speed of the planet carrier assembly member 346, and the ring gear/sun gear tooth ratio of the planetary gearset 340. The ring gear member 324, planet carrier assembly member 346, and output shaft 19 are rotated at a speed determined by the speed of the planet carrier assembly member 326 and the ring gear/sun gear tooth ratio of the planetary gearset 320. The numerical value of the third forward speed ratio is determined by the ring gear/sun gear tooth ratios of the planetary gearsets 320 and 340.

The fourth forward speed ratio is established with the engagement of the torque-transmitting mechanisms 350 and 354. During the fourth forward speed ratio, the ring gear member 344 and planet carrier assembly member 336 are rotated at a speed determined by the speed of the sun gear member 342, the speed of the planet carrier assembly member 346, and the ring gear/sun gear tooth ratio of the planetary gearset 340. The ring gear member 334 and planet carrier assembly member 326 are rotated at a speed determined by the speed of the sun gear member 332, the speed of the planet carrier assembly member 336, and the ring gear/sun gear tooth ratio of the planetary gearset 330. The ring gear member 324, planet carrier assembly member 346, and output shaft 19 are rotated at a speed determined by the speed of the planet carrier assembly member 326 and the ring gear/sun gear tooth ratio of the planetary gearset 320. The numerical value of the fourth forward speed ratio is determined by the ring gear/sun gear tooth ratios of all three planetary gearsets 320, 330, and 340.

The fifth forward speed ratio is established with the engagement of the torque-transmitting mechanisms 352 and 354. During the fifth forward speed ratio, the planetary gearset 340 and therefore output shaft 19 rotate in unison with the input shaft 17. The numerical value of the fifth forward speed ratio is one.

The sixth forward speed ratio is established with the engagement of the torque-transmitting mechanisms 350 and 352. During the sixth forward speed ratio, the planetary gearset 330 and planet carrier assembly member 326 are rotated in unison with the input shaft 17. The ring gear member 324, planet carrier assembly member 346, and the output shaft 19 are rotated at a speed determined by the speed of the planet carrier assembly member 326 and the ring gear/sun gear tooth ratio of the planetary gearset 320. The numerical value of the sixth forward speed ratio is determined by the ring gear/sun gear tooth ratio of the planetary gearset 320.

The seventh forward speed ratio is established with the engagement of the torque-transmitting mechanisms 352 and 358. During the seventh forward speed ratio, the ring gear member 334 and planet carrier assembly member 326 are rotated at a speed determined by the speed of the planet carrier assembly member 336 and the ring gear/sun gear tooth ratio of the planetary gearset 330. The ring gear member 324, planet carrier assembly member 346, and the output shaft 19 are rotated at a speed determined by the speed of the planet carrier assembly member 326 and the ring gear/sun gear tooth ratio of the planetary gearset 320. The numerical value of the seventh forward speed ratio is determined by the ring gear/sun gear tooth ratios of the planetary gearsets 320 and 330.

Figures 9, 10:
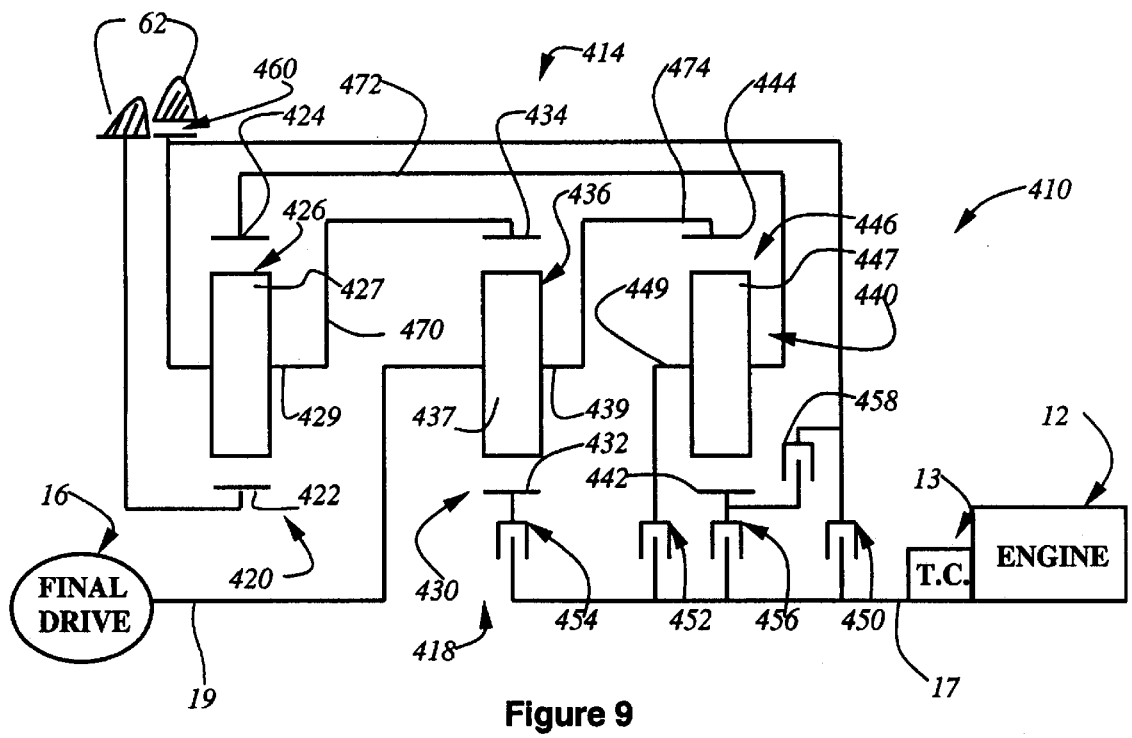
FIG. 9 is a schematic representation of a powertrain having another embodiment of the present invention incorporated therein.
FIG. 10 is a truth table and chart depicting some of the operating parameters of the embodiment shown in FIG. 9.

A powertrain 410, shown in FIG. 9, includes the engine 12, the starting device 13, a planetary transmission 414, and the final drive mechanism 16. The planetary transmission 414 includes the input shaft 17, a planetary gear arrangement 418, and the output shaft 19. The planetary gear arrangement 418 includes three planetary gearsets 420, 430, and 440, five rotating type torque-transmitting mechanisms 450, 452, 454, 456, 458, and one stationary type torque-transmitting mechanisms 460.

The planetary gearset 420 includes a sun gear member 422, a ring gear member 424, and a planet carrier assembly member 426. The planet carrier assembly member 426 includes a plurality of pinion gears 427 rotatably mounted on a planet carrier 429 and disposed in meshing relationship with the sun gear member 422 and the ring gear member 424.

The planetary gearset 430 includes a sun gear member 432, a ring gear member 434, and a planet carrier assembly member 436. The planet carrier assembly member 436 includes a plurality of pinion gears 437 rotatably mounted on a planet carrier 439 and disposed in meshing relationship with the sun gear member 432 and the ring gear member 434.

The planetary gearset 440 includes a sun gear member 442, a ring gear member 444, and a planet carrier assembly member 446. The planet carrier assembly member 446 includes a plurality of pinion gears 447 rotatably mounted on a planet carrier 449 and disposed in meshing relationship with the sun gear member 442 and the ring gear member 444.

The planet carrier assembly member 426 is continuously interconnected with the ring gear member 434 through an interconnecting member 470. The ring gear member 424 is continuously interconnected with the planet carrier assembly member 446 through an interconnecting member 472. The ring gear member 444, the planet carrier assembly member 436, and the output shaft 19 are continuously interconnected by an interconnecting member 474. The sun gear member 422 is continuously connected with the transmission housing 62.

The input shaft 17 is selectively interconnectible with the interconnecting member 470 through the torque-transmitting mechanism 450, selectively connectible with the interconnecting member 472 through the torque-transmitting mechanism 452, selectively interconnectible with the sun gear member 432 through the torque-transmitting mechanism 454, and selectively interconnectible with the sun gear member 442 through the torque-transmitting mechanism 456. The sun gear member 442 and planet carrier assembly member 426 are selectively interconnectible through the torque-transmitting mechanism 458. The interconnecting member 470 is selectively interconnectible with the transmission housing 62 through the torque-transmitting mechanism 460.

As seen in the truth table of FIG. 10, the torque-transmitting mechanisms are selectively engaged in combinations of two to establish seven forward speed ratios and one reverse speed ratio in the planetary gear arrangement 418. Also, the truth table provides a numerical example for the speed ratios that are available with the planetary gear arrangement 418 when the ring gear/sun gear tooth ratios of the planetary gearsets 420, 430, and 440 are as shown in the truth table as R1/S1, R2/S2, and R3/S3, respectively. Also described in FIG. 10 is a chart, which provides the numerical example of the step ratios between adjacent forward speed ratios as well as between the reverse and first forward speed ratio. The chart of FIG. 10 also gives a numerical example of the overall ratio spread for the forward speed ratios.

The reverse speed ratio is established with the engagement of the torque-transmitting mechanisms 456 and 460. During the reverse speed ratio, the ring gear member 444 and therefore output shaft 19 are rotated at a speed determined by the speed of the sun gear member 442 and the ring gear/sun gear tooth ratio of the planetary gearset 440. The numerical value of the reverse speed ratio is determined by the ring gear/sun gear tooth ratio of the planetary gearset 440.

The first forward speed ratio is established with the engagement of the torque-transmitting mechanisms 454 and 460. During the first forward speed ratio, the planet carrier assembly member 436 and therefore output shaft 19 are rotated at a speed determined by the speed of the sun gear member 432 and the ring gear/sun gear tooth ratio of the planetary gearset 430. The numerical value of the first forward speed ratio is determined by the ring gear/sun gear tooth ratio of the planetary gearset 430.

The second forward speed ratio is established with the engagement of the torque-transmitting mechanisms 454 and 458. During the second forward speed ratio, the ring gear member 434, planet carrier assembly member 426, and sun gear member 442 are rotated at a speed determined by the speed of the sun gear member 432, the speed of the planet carrier assembly member 436, and the ring gear/sun gear tooth ratio of the planetary gearset 430. The ring gear member 424 and planet carrier assembly member 446 are rotated at a speed determined by the speed of the planet carrier assembly member 426 and the ring gear/sun gear tooth ratio of the planetary gearset 420. The ring gear member 444, planet carrier assembly member 436, and output shaft 19 are rotated at a speed determined by the speed of the sun gear member 442, the speed of the planet carrier assembly member 446, and ring gear/sun gear tooth ratio of the planetary gearset 440. The numerical value of the second forward speed ratio is determined by the ring gear/sun gear tooth ratios of all three planetary gearsets 420, 430, and 440.

The third forward speed ratio is established with the engagement of the torque-transmitting mechanisms 454 and 456. During the third forward speed ratio, the ring gear member 434 and planet carrier assembly member 426 are rotated at a speed determined by the speed of the sun gear member 432, the speed of the planet carrier assembly member 436, and the ring gear/sun gear tooth ratio of the planetary gearset 430. The ring gear member 424 and planet carrier assembly member 446 are rotated at a speed determined by the speed of the planet carrier assembly member 426 and the ring gear/sun gear tooth ratio of the planetary gearset 420. The ring gear member 444, planet carrier assembly member 436, and the output shaft 19 are rotated at a speed determined by the speed of the planet carrier assembly member 446, the speed of the sun gear member 442, and the ring gear/sun gear tooth ratio of the planetary gearset 440. The numerical value of the third forward speed ratio is determined by the ring gear/sun gear tooth ratios of all three planetary gearsets 420, 430, and 440.

The fourth forward speed ratio is established with the engagement of the torque-transmitting mechanisms 452 and 454. During the fourth forward speed ratio, the planet carrier assembly member 426 and ring gear member 434 are rotated at a speed determined by the speed of the ring gear member 424 and the ring gear/sun gear tooth ratio of the planetary gearset 420. The planet carrier assembly member 436 and output shaft 19 are rotated at a speed determined by the speed of the ring gear member 434, the speed of the sun gear member 432, and the ring gear/sun gear tooth ratio of the of planetary gearset 430. The numerical value of the fourth forward speed ratio is determined by the ring gear/sun gear tooth ratios of the planetary gearsets 420 and 430.

The fifth forward speed ratio is established with the engagement of the torque-transmitting mechanisms 452 and 456. During the fifth forward speed ratio, the planetary gearset 440 and therefore the output shaft 19 are rotated at the same speed as the input shaft 17. The numerical value of the fifth forward speed ratio is one.

The sixth forward speed ratio is established with the engagement of the torque-transmitting mechanisms 452 and 458. During the sixth forward speed ratio, the planet carrier assembly member 426 and sun gear member 442 are rotated at a speed determined by the speed of the ring gear member 424 and the ring gear/sun gear tooth ratio of the planetary gearset 420. The ring gear member 444 and therefore output shaft 19 are rotated at a speed determined by the speed of the planet carrier assembly member 446, the speed of the sun gear member 442, and the ring gear/sun gear tooth ratio of the planetary gearset 440. The numerical value of the sixth forward speed ratio is determined by the ring gear/sun gear tooth ratios of the planetary gearsets 420 and 440.

The seventh forward speed ratio is established with the engagement of the torque-transmitting mechanisms 450 and 458. During the seventh forward speed ratio, the ring gear member 424 and planet carrier assembly member 446 are rotated at a speed determined by the speed of the planet carrier assembly member 426 and the ring gear/sun gear tooth ratio of the planetary gearset 420. The ring gear member 444 and therefore output shaft 19 are rotated at a speed determined by the speed of the sun gear member 442, the speed of the planet carrier assembly member 446, and the ring gear/sun gear tooth ratio of the planetary gearset 440. The numerical value of the seventh forward speed ratio is determined by the ring gear/sun gear tooth ratios of the planetary gearsets 420 and 440.

Figures 11, 12:
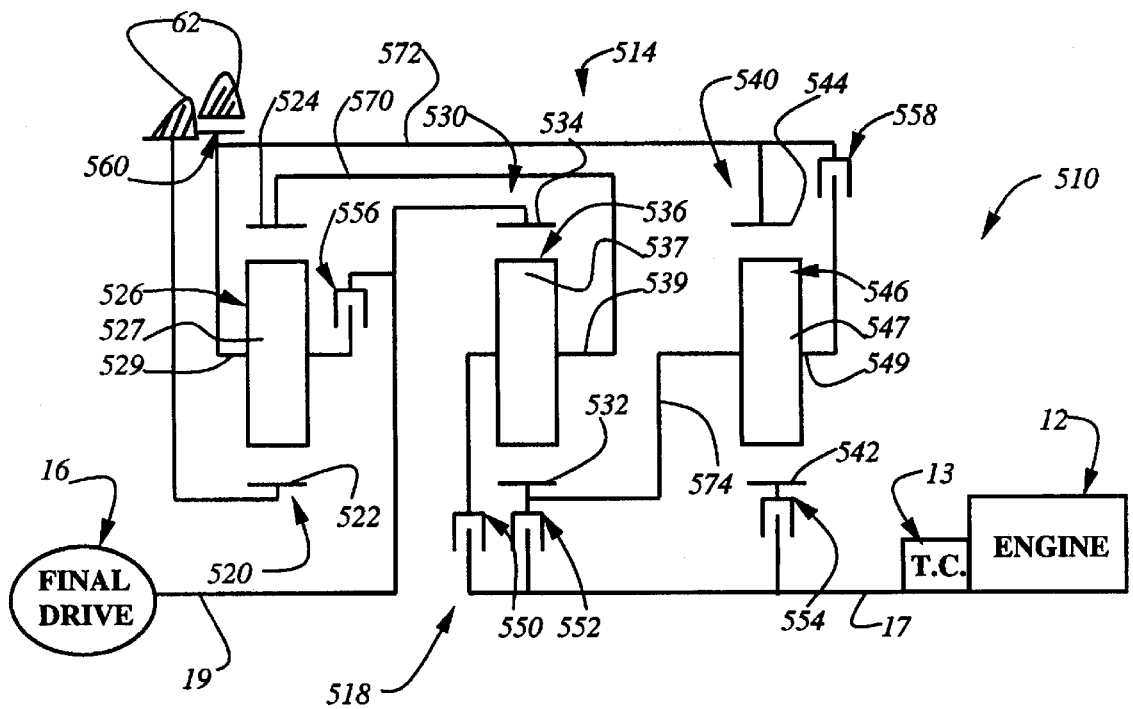
FIG. 11 is a schematic representation of a powertrain having another embodiment of the present invention incorporated therein.
FIG. 12 is a truth table and chart depicting some of the operating parameters of the embodiment shown in FIG. 11.

A powertrain 510, shown in FIG. 11, includes the engine 12, the starting device 13, a planetary transmission 514, and the final drive mechanism 16. The planetary transmission 514 includes the input shaft 17, a planetary gear arrangement 518, and the output shaft 19. The planetary gear arrangement 518 includes three planetary gearsets 520, 530, and 540, five rotating type torque-transmitting mechanisms 550, 552, 554, 556, 558 and one stationary type torque-transmitting mechanisms 560.

The planetary gearset 520 includes a sun gear member 522, a ring gear member 524, and a planet carrier assembly member 526. The planet carrier assembly member 526 includes a plurality of pinion gears 527 rotatably mounted on a planet carrier 529 and disposed in meshing relationship with the sun gear member 522 and the ring gear member 524.

The planetary gearset 530 includes a sun gear member 532, a ring gear member 534, and a planet carrier assembly member 536. The planet carrier assembly member 536 includes a plurality of pinion gears 537 rotatably mounted on a planet carrier 539 and disposed in meshing relationship with the sun gear member 532 and the ring gear member 534.

The planetary gearset 540 includes a sun gear member 542, a ring gear member 544, and a planet carrier assembly member 546. The planet carrier assembly member 546 includes a plurality of pinion gears 547 rotatably mounted on a planet carrier 549 and disposed in meshing relationship with the sun gear member 542 and the ring gear member 544.

The ring gear member 524 and planet carrier assembly member 536 are continuously interconnected by an interconnecting member 570. The planet carrier assembly member 526 and ring gear member 544 are continuously interconnected by an interconnecting member 572. The sun gear member 532 and planet carrier assembly member 546 are continuously interconnected by an interconnecting member 574. The output shaft 19 is continuously interconnected with the ring gear member 534. The sun gear member 522 is continuously interconnected with the transmission housing 62.

The input shaft 17 is selectively interconnectible with the interconnecting member 570 through the torque-transmitting mechanism 550, selectively interconnectible with the interconnecting member 574 through the torque-transmitting mechanism 552, and selectively interconnectible with the sun gear member 542 through the torque-transmitting mechanism 554. The interconnecting member 572 is selectively interconnectible with the output shaft 19 through the torque-transmitting mechanism 556. The interconnecting member 572 is selectively interconnectible with the interconnecting member 574 through the torque-transmitting mechanism 558. The interconnecting member 572 is selectively connectible with the transmission housing 62 through the torque-transmitting mechanism 560.

As seen in the truth table of FIG. 12, the torque-transmitting mechanisms are engaged in combinations of two to establish seven forward speed ratios and one reverse speed ratio in the planetary gear arrangement 518. Also given in the truth table is an example of the numerical values of the speed ratios that are available with the planetary gear arrangement 518. These numerical values are determined by the ring gear/sun gear tooth ratios of the planetary gearsets 520, 530, and 540, which are given by way of example in FIG. 12 as R1/S1, R2/S2, and R3/S3, respectively. A chart in FIG. 12 gives the numerical example of the ratio steps between adjacent forward speed ratios as well as between the reverse and first forward speed ratio when the numerical values for the speed ratios given the truth table are employed. Also given in the chart of FIG. 12 is the numerical value of the overall ratio spread for the forward speed ratios.

The reverse speed ratio is established with the engagement of the torque-transmitting mechanisms 554 and 560. During the reverse speed ratio, the planet carrier assembly member 546 and sun gear member 532 are rotated at a speed determined by the speed of the sun gear member 542 and the ring gear/sun gear tooth ratio of the planetary gearset 540. The ring gear member 534 and therefore output shaft 19 are rotated at a speed determined by the speed of the sun gear member 532 and the ring gear/sun gear tooth ratio of the planetary gearset 530. The numerical value of the reverse speed ratio is determined by the ring gear/sun gear tooth ratios of the planetary gearsets 530 and 540.

The first forward speed ratio is established with the engagement of the torque-transmitting mechanisms 554 and 556. During the first forward speed ratio, the planet carrier assembly member 546 and sun gear member 532 are rotated at a speed determined by the speed of the sun gear member 542, the speed of the ring gear member 544, and the ring gear/sun gear tooth ratio of the planetary gearset 540. The planet carrier assembly member 536 and ring gear member 524 are rotated at a speed determined by the speed of the sun gear member 532, the speed of the ring gear member 534, and the ring gear/sun gear tooth ratio of the planetary gearset 530. The planet carrier assembly member 526, ring gear member 544, ring gear member 534, and the output shaft 19 are rotated at a speed determined by the speed of the ring gear member 524 and the ring gear/sun gear tooth ratio of the planetary gearset 520. The numerical value of the first forward speed ratio is determined by the ring gear/sun gear tooth ratios of all three planetary gearsets 520, 530, and 540.

The second forward speed ratio is established with the engagement of the torque-transmitting mechanisms 552 and 556. During the second forward speed ratio, the planet carrier assembly member 536 and ring gear member 524 are rotated at a speed determined by the speed of the sun gear member 532, the speed of the ring gear member 534, and the ring gear/sun gear tooth ratio of the planetary gearset 530. The planet carrier assembly member 526, ring gear member 544, ring gear member 534, and the output shaft 19 are rotated at a speed determined by the speed of the ring gear member 524 and the ring gear/sun gear tooth ratio of the planetary gearset 520. The numerical value of the second forward speed ratio is determined by the ring gear/sun gear tooth ratios of the planetary gearsets 520 and 530.

The third forward speed ratio is established with the engagement of the torque-transmitting mechanisms 550 and 556. During the third forward speed ratio, the planet carrier assembly member 526, ring gear member 544, ring gear member 534, and therefore output shaft 19 are rotated at a speed determined by the speed of the ring gear member 524 and the ring gear/sun gear tooth ratio of the planetary gearset 520. The numerical value of the third forward speed ratio is determined by the ring gear/sun gear tooth ratio of the planetary gearset 520.

The fourth forward speed ratio is established with the engagement of the torque-transmitting mechanisms 550 and 552. During the fourth forward speed ratio, the planetary gearset 530 and therefore output shaft 19 are rotated in unison with the input shaft 17. The numerical value of the fourth forward speed ratio is one.

The fifth forward speed ratio is established with the engagement of the torque-transmitting mechanisms 550 and 554. During the fifth forward speed ratio, the planet carrier assembly member 526 and ring gear member 544 are rotated at a speed determined by the speed of the ring gear member 524 and the ring gear/sun gear tooth ratio of the planetary gearset 520. The planet carrier assembly member 546 and sun gear member 532 are rotated at a speed determined by the speed of the sun gear member 542, the speed of the ring gear member 544, and the ring gear/sun gear tooth ratio of the planetary gearset 540. The ring gear member 534 and therefore output shaft 19 are rotated at a speed determined by the speed of the planet carrier assembly member 536, the speed of the sun gear member 532, and the ring gear/sun gear tooth ratio of the planetary gearset 530. The numerical value of the fifth forward speed ratio is determined by the ring gear/sun gear tooth ratios of all three planetary gearsets 520, 530, and 540.

The sixth forward speed ratio is established with the engagement with of the torque-transmitting mechanisms 550 and 558. During the sixth forward speed ratio, the planet carrier assembly member 526 and sun gear member 532 are rotated at a speed determined by the speed of the ring gear member 524 and the ring gear/sun gear tooth ratio of the planetary gearset 520. The ring gear member 534 and therefore output shaft 19 are rotated at a speed determined by the speed of the planet carrier assembly member 536, the speed of the sun gear member 532, and the ring gear/sun gear tooth ratio of the planetary gearset 530. The numerical value of the sixth forward speed ratio is determined by the ring gear/sun gear tooth ratios of the planetary gearsets 520 and 530.

The seventh forward speed ratio is established with the engagement of the torque-transmitting mechanisms 552 and 558. During the seventh forward speed ratio, the ring gear member 524 and planet carrier assembly member 536 are rotated at a speed determined by the speed of the planet carrier assembly member 526 and the ring gear/sun gear tooth ratio of the planetary gearset 520. The speed of the ring gear member 534 and therefore output shaft 19 are determined by the speed of the sun gear member 532, the speed of the planet carrier assembly member 536, and the ring gear/sun gear tooth ratio of the planetary gearset 530. The numerical value of the seventh forward speed ratio is determined by the ring gear/sun gear tooth ratios of the planetary gearsets 520 and 530.

Figures 13, 14:
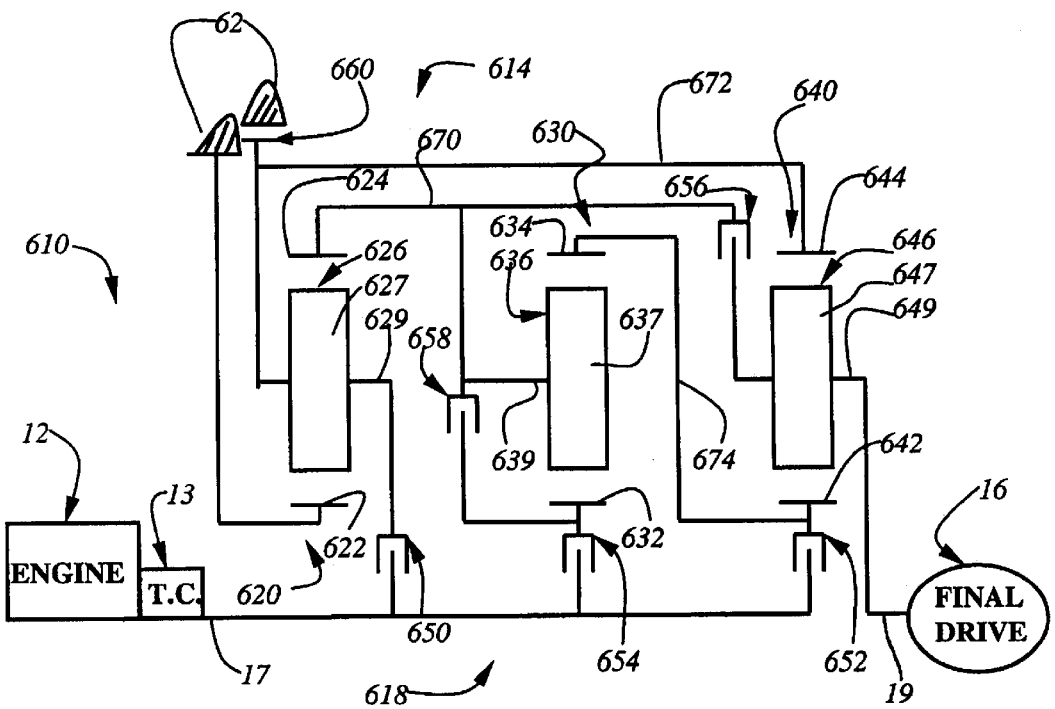
FIG. 13 is a schematic representation of a powertrain having another embodiment of the present invention incorporated therein.
FIG. 14 is a truth table and chart depicting some of the operating parameters of the embodiment shown in FIG. 13.

A powertrain 610, shown in FIG. 13, includes the engine 12, the starting device 13, a planetary transmission 614, and the final drive mechanism 16. The planetary transmission 614 includes the input shaft 17, a planetary gear arrangement 618, and the output shaft 19. The planetary gear arrangement 618 includes three planetary gearsets 620, 630, and 640, five rotating type torque-transmitting mechanisms 650, 652, 654, 656, 658 and one stationary type torque-transmitting mechanisms 660.

The planetary gearset 620 includes a sun gear member 622, a ring gear member 624, and a planet carrier assembly member 626. The planet carrier assembly member 626 includes a plurality of pinion gears 627 rotatably mounted on a planet carrier 629 and disposed in meshing relationship with the sun gear member 622 and the ring gear member 624.

The planetary gearset 630 includes a sun gear member 632, a ring gear member 634, and a planet carrier assembly member 636. The planet carrier assembly member 636 includes a plurality of pinion gears 637 rotatably mounted on a planet carrier 639 and disposed in meshing relationship with the sun gear member 632 and the ring gear member 634.

The planetary gearset 640 includes a sun gear member 642, a ring gear member 644, and a planet carrier assembly member 646. The planet carrier assembly member 646 includes a plurality of pinion gears 647 rotatably mounted on a planet carrier 649 and disposed in meshing relationship with the sun gear member 642 and the ring gear member 644.

The ring gear member 624 and planet carrier assembly member 636 are continuously interconnected by an interconnecting member 670. The planet carrier assembly member 626 and ring gear member 644 are continuously interconnected by an interconnecting member 672. The ring gear member 634 and sun gear member 642 are continuously interconnected by an interconnecting member 674. The sun gear member 622 is continuously connected with the transmission housing 62. The output shaft 19 is continuously interconnected with the planet carrier assembly member 646 and selectively interconnectible with the interconnecting member 670 through the torque-transmitting mechanism 656.

The input shaft 17 is selectively interconnectible with the interconnecting member 670 through the torque-transmitting mechanism 650, selectively interconnectible with the interconnecting member 674 through the torque-transmitting mechanism 652, and selectively interconnectible with the sun gear member 632 through the torque-transmitting mechanism 654. The sun gear member 632 is selectively interconnectible with the interconnecting member 670 through the torque-transmitting mechanism 658. The interconnecting member 672 is selectively interconnectible with the transmission housing 62 through the torque-transmitting mechanism 660.

The truth table of FIG. 14 describes the engagement combinations and sequence for the torque-transmitting mechanisms in order to establish seven forward speed ratios and one reverse speed ratio in the planetary gear arrangement 618. An example of the numerical values for these speed ratios is also given in the truth table. The numerical example is determined by the ring gear/sun gear tooth ratios of the planetary gearsets 620, 630, and 640, which are shown in FIG. 14 as R1/S1, R2/S2, and R3/S3, respectively. Also given in FIG. 14 is a chart, which provides the numerical values for the step ratios between the adjacent forward speed ratios as well as between the reverse and first forward speed ratio. The numerical value of the overall ratio spread for forward speed ratios is also given in the chart.

The reverse speed ratio is established with the engagement of the torque-transmitting mechanisms 654 and 660. During the reverse speed ratio, the ring gear member 634 and sun gear member 642 are rotated at a speed determined by the speed of the sun gear member 632 and the ring gear/sun gear tooth ratio of the planetary gearset 630. The planet carrier assembly member 646 and therefore output shaft 19 are rotated at a speed determined by the speed of the sun gear member 642 and the ring gear/sun gear tooth ratio of the planetary gearset 640. The numerical value of the reverse speed ratio is determined by the ring gear/sun gear tooth ratios of the planetary gearsets 630 and 640.

The first forward speed ratio is established with the engagement of the torque-transmitting mechanisms 652 and 660. During the first forward speed ratio, the planet carrier assembly member 646 and therefore output shaft 19 are rotated at a speed determined by the speed of the sun gear member 642 and the ring gear/sun gear tooth ratio of the planetary gearset 640. The numerical value of the first forward speed ratio is determined by the ring gear/sun gear tooth ratio of the planetary gearset 640.

The second forward speed ratio is established with the engagement of the torque-transmitting mechanisms 652 and 656. During the second forward speed ratio, the ring gear member 644 and planet carrier assembly member 626 are rotated at a speed determined by the speed of the sun gear member 642, the speed of the planet carrier assembly member 646, and the ring gear/sun gear tooth ratio of the planetary gearset 640. The ring gear member 624, planet carrier assembly member 646, and output shaft 19 are rotated at a speed determined by the speed of the planet carrier assembly member 626 and the ring gear/sun gear tooth ratio of the planetary gearset 620. The numerical value of the second forward speed ratio is determined by the ring gear/sun gear tooth ratios of the planetary gearsets 620 and 640.

The third forward speed ratio is established with the engagement of the torque-transmitting mechanisms 652 and 658. During the third forward speed ratio, the planet carrier assembly member 626 and ring gear member 644 are rotated at a speed determined by the speed of the ring gear member 624 and the ring gear/sun gear tooth ratio of the planetary gearset 620. The planet carrier assembly member 646 and therefore output shaft 19 are rotated at a speed determined by the speed of the sun gear member 642, the speed of the ring gear member 644, and the ring gear/sun gear tooth ratio of the planetary gearset 640. It should be noted that the ring gear member 624 rotates at the speed of the input shaft 17 during the third forward speed ratio. The numerical value of the third forward speed ratio is determined by the ring gear/sun gear tooth ratios of the planetary gearsets 620 and 640.

The fourth forward speed ratio is established with the engagement of the torque-transmitting mechanism 650 and 652. During the fourth forward speed ratio, the planetary gearset 640 and therefore output shaft 19 are rotated in unison with the input shaft 17. The numerical value of the fourth forward speed ratio is one.

The fifth forward speed ratio is established with the engagement of the torque-transmitting mechanisms 650 and 658. During the fifth forward speed ratio, the ring gear member 624 and sun gear member 642 are rotated at a speed determined by the speed of the planet carrier assembly member 626 and the ring gear/sun gear tooth ratio of the planetary gearset 620. The planet carrier assembly member 646 and therefore output shaft 19 are rotated at a speed determined by the speed of the ring gear member 644, the speed of the sun gear member 642, and the ring gear/sun gear tooth ratio of the planetary gearset 640. The numerical value of the fifth forward speed ratio is determined by the ring gear/sun gear tooth ratios of the planetary gearsets 620 and 640.

The sixth forward speed ratio is established with the engagement of the torque-transmitting mechanisms 650 and 654. During the sixth forward speed ratio, the ring gear member 624 and planet carrier assembly member 636 are rotated at a speed determined by the speed of the planet carrier assembly member 626 and the ring gear/sun gear tooth ratio of the planetary gearset 620. The ring gear member 634 and sun gear member 642 are rotated at a speed determined by the speed of the planet carrier assembly member 636, the speed of the sun gear member 632, and the ring gear/sun gear tooth ratio of the planetary gearset 630. The planet carrier assembly member 646 and therefore output shaft 19 are rotated at a speed determined by the speed of the ring gear member 644, the speed of the sun gear member 642, and the ring gear/sun gear tooth ratio of the planetary gearset 640. The numerical value of the sixth forward speed ratio is determined by the ring gear/sun gear tooth ratios of all three planetary gearsets 620, 630, and 640.

The seventh forward speed ratio is established with the engagement of the torque-transmitting mechanisms 650 and 656. During the seventh forward speed ratio, the ring gear member 624, planet carrier assembly member 636, planet carrier assembly member 646, and output shaft 19 are rotated at a speed determined by the speed of the planet carrier assembly member 626 and the ring gear/sun gear tooth ratio of the planetary gearset 620. The numerical value of the seventh forward speed ratio is determined by the ring gear/sun gear tooth ratio of the planetary gearset 620.

Figures 15, 16:
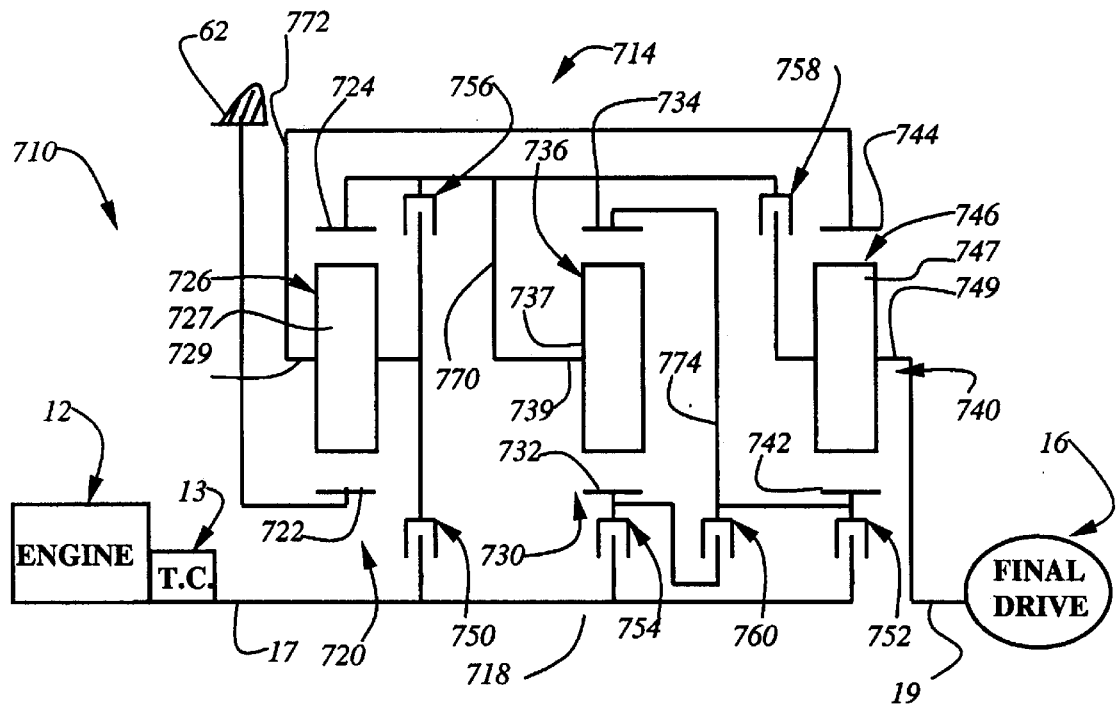
FIG. 15 is a schematic representation of a powertrain having another embodiment of the present invention incorporated therein.
FIG. 16 is a truth table and chart depicting some of the operating parameters of the embodiment shown in FIG. 15.

A powertrain 710, shown in FIG. 15, includes the engine 12, the starting device 13, a planetary transmission 714, and the final drive mechanism 16. The planetary transmission 714 includes the input shaft 17, a planetary gear arrangement 718, and the output shaft 19. The planetary gear arrangement 718 includes three planetary gearsets 720, 730, and 740, and six rotating type torque-transmitting mechanisms 750, 752, 754, 756, 758, and 760.

The planetary gearset 720 includes a sun gear member 722, a ring gear member 724, and a planet carrier assembly member 726. The planet carrier assembly member 726 includes a plurality of pinion gears 727 rotatably mounted on a planet carrier 729 and disposed in meshing relationship with the sun gear member 722 and the ring gear member 724.

The planetary gearset 730 includes a sun gear member 732, a ring gear member 734, and a planet carrier assembly member 736. The planet carrier assembly member 736 includes a plurality of pinion gears 737 rotatably mounted on a planet carrier 739 and disposed in meshing relationship with the sun gear member 732 and the ring gear member 734.

The planetary gearset 740 includes a sun gear member 742, a ring gear member 744, and a planet carrier assembly member 746. The planet carrier assembly member 746 includes a plurality of pinion gears 747 rotatably mounted on a planet carrier 749 and disposed in meshing relationship with the sun gear member 742 and the ring gear member 744.

The ring gear member 724 and planet carrier assembly member 736 are continuously interconnected by an interconnecting member 770. The planet carrier assembly member 726 and ring gear member 744 are continuously interconnected by an interconnecting member 772. The ring gear member 734 and sun gear member 742 are continuously interconnected by an interconnecting member 774. The sun gear member 722 is continuously interconnected with the transmission housing 62. The output shaft 19 is continuously interconnected with the planet carrier assembly member 746 and selectively interconnectible with the interconnecting member 770 through the torque-transmitting mechanism 758.

The input shaft 17 is selectively interconnectible with the interconnecting member 772 through the torque-transmitting mechanism 750, selectively interconnectible with the interconnecting member 774 through the torque-transmitting mechanism 752, and selectively interconnectible with the sun gear member 732 through the torque-transmitting mechanism member 754. The interconnecting member 772 is selectively interconnectible with the interconnecting member 770 through the torque-transmitting mechanism 756. The sun gear member 732 is selectively interconnectible with the interconnecting member 774 through the torque-transmitting mechanism 760.

The truth table of FIG. 16 describes the engagement combinations and sequence for the torque-transmitting mechanisms to establish seven forward speed ratios and one reverse speed ratio within the planetary gear arrangement 718. Also given in the truth table are numerical examples that are available with the planetary gear arrangement 718 when the ring gear/sun gear tooth ratios of the planetary gearsets 720, 730, and 740 are as shown in FIG. 16 as R1/S1, R2/S2, and R3/S3, respectively. Also given in FIG. 16 is a chart which gives a numerical example of the ratio steps between adjacent forward speed ratios as well as between the reverse and first forward speed ratio, as well as the overall ratio spread of the forward speed ratios.

The reverse speed ratio is established with the engagement of the torque-transmitting mechanisms 754 and 756. During the reverse speed ratio, the ring gear member 734 and sun gear member 742 are rotated at a speed determined by the speed of the sun gear member 732 and the ring gear/sun gear tooth ratio of the planetary gearset 730. The planet carrier assembly member 746 and therefore output shaft 19 are rotated at a speed determined by the speed of the sun gear member 742 and the ring gear/sun gear tooth ratio of the planetary gearset 740. The numerical value of the reverse speed ratio is determined by the ring gear/sun gear tooth ratios of the planetary gearsets 730 and 740.

The first forward speed ratio is established with the engagement of the torque-transmitting mechanisms 752 and 756. During the first forward speed ratio, the planet carrier assembly member 746 and therefore output shaft 19 are rotated at a speed determined by the speed of the sun gear member 742 and the ring gear/sun gear tooth ratio of the planetary gearset 740. The numerical value of the first forward speed ratio is determined by the ring gear/sun gear tooth ratio of the planetary gearset 740.

The second forward speed ratio is established with the engagement of the torque-transmitting mechanisms 752 and 758. During the second forward speed ratio, the ring gear member 744 and planet carrier assembly member 726 are rotated at a speed determined by the speed of the sun gear member 742, the speed of the planet carrier assembly member 746, and the ring gear/sun gear tooth ratio of the planetary gearset 740. The ring gear member 724, planet carrier assembly member 736, planet carrier assembly member 746 and therefore output shaft 19 are rotated at a speed determined by the speed of the planet carrier assembly member 726 and the ring gear/sun gear tooth ratio of the planetary gearset 720. The numerical value of the second forward speed ratio is determined by the ring gear/sun gear tooth ratios of the planetary gearsets 720 and 740.

The third forward speed ratio is established with the engagement of the torque-transmitting mechanisms 752 and 760. During the third forward speed ratio, the planet carrier assembly member 726 and ring gear member 744 are rotated at a speed determined by the speed of the ring gear member 724 and the ring gear/sun gear tooth ratio of the planetary gearset 720. The planet carrier assembly member 746 and therefore output shaft 19 are rotated at a speed determined by the speed of the sun gear member 742, the speed of the ring gear member 744, and the ring gear/sun gear tooth ratio of the planetary gearset 740. The numerical value of the third forward speed ratio is determined by the ring gear/sun gear tooth ratios of the planetary gearsets 720 and 740.

The fourth forward speed ratio is established with the engagement of the torque-transmitting mechanisms 750 and 752. During the fourth forward speed ratio, the planetary gearset 740 and therefore output shaft 19 rotate in unison with the input shaft 17. The numerical value of the fourth forward speed ratio is one.

The fifth forward speed ratio is established with the engagement of the torque-transmitting mechanisms 750 and 760. During the fifth forward speed ratio, the ring gear member 724 and sun gear member 742 are rotated at a speed determined by the speed of the planet carrier assembly member 726 and the ring gear/sun gear tooth ratio of the planetary gearset 720. The planet carrier assembly member 746 and therefore output shaft 19 are rotated at a speed determined by the speed of the sun gear member 742, the speed of the ring gear member 744, and the ring gear/sun gear tooth ratio of the planetary gearset 740. The numerical value of the fifth forward speed ratio is determined by the ring gear/sun gear tooth ratios of the planetary gearsets 720 and 740.

The sixth forward speed ratio is established with the engagement of the torque-transmitting mechanisms 750 and 754. During the sixth forward speed ratio, the ring gear member 724 and planet carrier assembly member 736 are rotated at a speed determined by the speed of the planet carrier assembly member 726 and the ring gear/sun gear tooth ratio of the planetary gearset 720. The ring gear member 734 and sun gear member 742 are rotated at a speed determined by the speed of the planet carrier assembly member 736, the speed of the sun gear member 732, and the ring gear/sun gear tooth ratio of the planetary gearset 730. The planet carrier assembly member 746 and therefore output shaft 19 are rotated at a speed determined by the speed of the sun gear member 742, the speed of the ring gear member 744, and the ring gear/sun gear tooth ratio of the planetary gearset 740. The numerical value of the sixth forward speed ratio is determined by the ring gear/sun gear tooth ratios of all three planetary gearsets 720, 730, and 740.

The seventh forward speed ratio is established with the engagement of the torque-transmitting mechanisms 750 and 758. During the seventh forward speed ratio, the ring gear member 724, planet carrier assembly member 736, planet carrier assembly member 746, and output shaft 19 are rotated at a speed determined by the speed of the planet carrier assembly member 726 and the ring gear/sun gear tooth ratio of the planetary gearset 720. The numerical value of the seventh forward speed ratio is determined by the ring gear/sun gear tooth ratio of the planetary gearset 720.

Figures 17, 18:
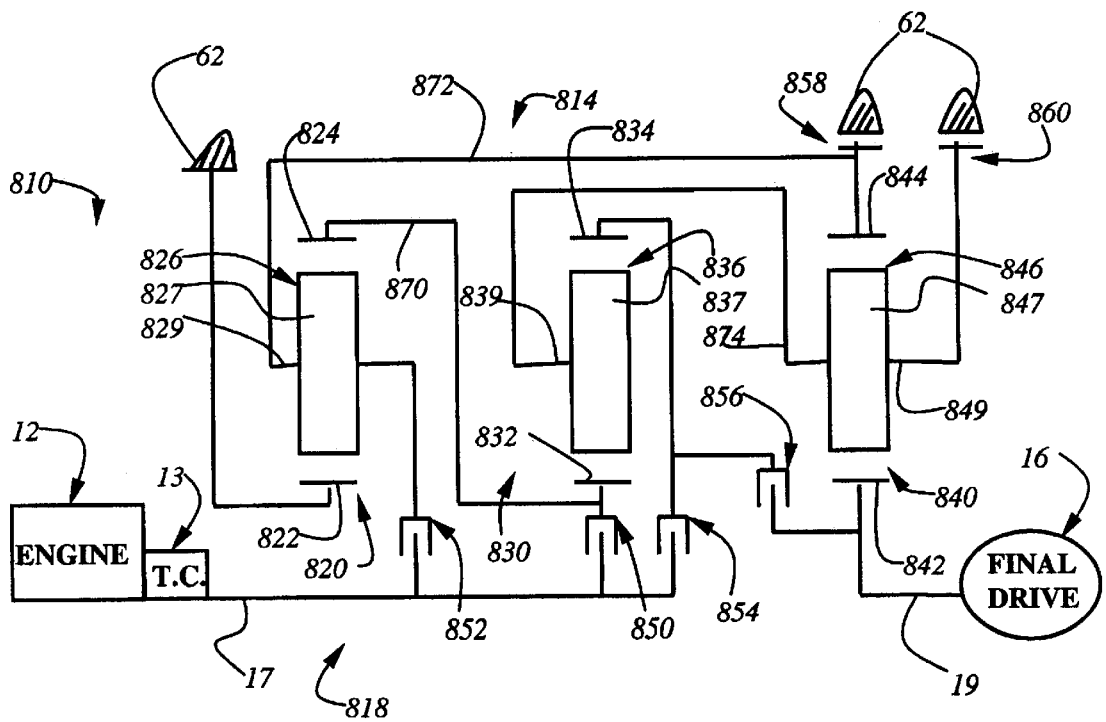
FIG. 17 is a schematic representation of a powertrain having another embodiment of the present invention incorporated therein.
FIG. 18 is a truth table and chart depicting some of the operating parameters of the embodiment shown in FIG. 17.

A powertrain 810, shown in FIG. 17, includes the engine 12, the starting device 13, a planetary transmission 814, and the final drive mechanism 16. The planetary transmission 814 includes the input shaft 17, a planetary gear arrangement 818, and the output shaft 19. The planetary gear arrangement 818 includes three planetary gearsets 820, 830, and 840, four rotating type torque-transmitting mechanisms 850, 852, 854, 856, and two stationary type torque-transmitting mechanisms 858 and 860.

The planetary gearset 820 includes a sun gear member 822, a ring gear member 824, and a planet carrier assembly member 826. The planet carrier assembly member 826 includes a plurality of pinion gears 827 rotatably mounted on a planet carrier 829 and disposed in meshing relationship with the sun gear member 822 and the ring gear member 824.

The planetary gearset 830 includes a sun gear member 832, a ring gear member 834, and a planet carrier assembly member 836. The planet carrier assembly member 836 includes a plurality of pinion gears 837 rotatably mounted on a planet carrier 839 and disposed in meshing relationship with the sun gear member 832 and the ring gear member 834.

The planetary gearset 840 includes a sun gear member 842, a ring gear member 844, and a planet carrier assembly member 846. The planet carrier assembly member 846 includes a plurality of pinion gears 847 rotatably mounted on a planet carrier 849 and disposed in meshing relationship with the sun gear member 842 and the ring gear member 844.

The ring gear member 824 and the sun gear member 832 are continuously interconnected by a interconnecting member 870. The planet carrier assembly member 826 and the ring gear member 844 are continuously interconnected by an interconnecting member 872. The planet carrier member 836 is continuously interconnected with the planet carrier assembly member 846 by an interconnecting member 874. The output shaft 19 is continuously interconnected with the sun gear member 842. The sun gear member 822 is continuously interconnected with the transmission housing 62.

The input shaft 17 is selectively interconnectible with the interconnecting member 870 through the torque-transmitting mechanism 850, selectively interconnectible with the interconnecting member 872 through the torque-transmitting mechanism 852, and selectively interconnectible with the ring gear member 834 through the torque-transmitting mechanism 854. The ring gear member 834 is selectively interconnectible with the output shaft 19 through the torque-transmitting mechanism 856. The interconnecting member 872 is selectively interconnected with the transmission housing 62 through the torque-transmitting mechanism 858. The interconnecting member 874 is selectively interconnectible with the transmission housing 62 through the torque-transmitting mechanism 860.

The truth table of FIG. 18 describes the combinations and sequence of engagements for the torque-transmitting mechanisms in order to establish seven forward speed ratios and one reverse speed ratio between the input shaft 17 and the output shaft 19 through the planetary gearset 818. The truth table also provides a numerical example for the speed ratios that are available within the planetary gear arrangement 818 when the ring gear/sun gear tooth ratios of the planetary gearsets 820, 830, and 840 are as shown in FIG. 18 as R1/S1, R2/S2, and R3/S3, respectively. The chart in FIG. 18 provides a numerical example of the ratio steps between the reverse and first forward speed ratio, the adjacent seven forward speed ratios, and the overall ratio spread of the forward speed ratios.

Upon reviewing the truth table in planetary gear arrangement 818, those skilled in the art will recognize that the numerical values of the reverse speed ratio and the fifth forward speed ratio are determined by the ring gear/sun gear tooth ratios of the planetary gearsets 820 and 840. The numerical values of the first forward speed ratio, the second forward speed ratio, the fourth forward speed ratio, and the seventh forward speed ratio are determined by the ring gear/sun gear tooth ratios of all three planetary gearsets 820, 830, and 840. The numerical value of the third forward speed ratio is one. The numerical value of the sixth forward speed ratio is determined by the ring gear/sun gear tooth ratios of the planetary gearsets 830 and 840.

Figures 19, 20:
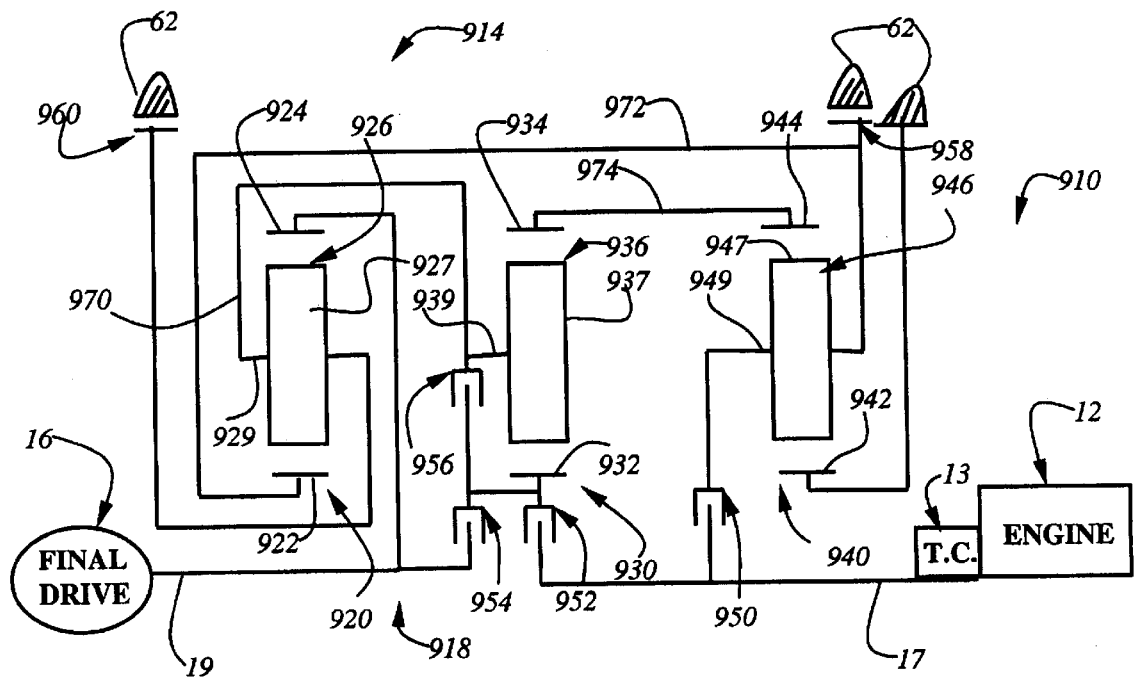
FIG. 19 is a schematic representation of a powertrain having another embodiment of the present invention incorporated therein.
FIG. 20 is a truth table and chart depicting some of the operating parameters of the embodiment shown in FIG. 19.

A powertrain 910, shown in FIG. 19, includes the engine 12, the starting device 13, a planetary transmission 914, and the final drive mechanism 16. The planetary transmission 914 includes the input shaft 17, a planetary gear arrangement 918, and the output shaft 19. The planetary gear arrangement 918 includes three planetary gearsets 920, 930, and 940, four rotating type torque-transmitting mechanisms 950, 952, 954, 956, and two stationary type torque-transmitting mechanisms 958 and 960.

The planetary gearset 920 includes a sun gear member 922, a ring gear member 924, and a planet carrier assembly member 926. The planet carrier assembly member 926 includes a plurality of pinion gears 927 rotatably mounted on a planet carrier 929 and disposed in meshing relationship with the sun gear member 922 and the ring gear member 924.

The planetary gearset 930 includes a sun gear member 932, a ring gear member 934, and a planet carrier assembly member 936. The planet carrier assembly member 936 includes a plurality of pinion gears 937 rotatably mounted on a planet carrier 939 and disposed in meshing relationship with the sun gear member 932 and the ring gear member 934.

The planetary gearset 940 includes a sun gear member 942, a ring gear member 944, and a planet carrier assembly member 946. The planet carrier assembly member 946 includes a plurality of pinion gears 947 rotatably mounted on a planet carrier 949 and disposed in meshing relationship with the sun gear member 942 and the ring gear member 944.

The planet carrier assembly member 926 is continuously interconnected with the planet carrier assembly member 936 through an interconnecting member 970. The sun gear member 922 and planet carrier assembly member 946 are continuously interconnected by an interconnecting member 972. The ring gear members 934 and 944 are continuously interconnected by an interconnecting member 974. The output shaft 19 is continuously interconnected with the ring gear member 924. The sun gear member 942 is continuously connected with the transmission housing 62.

The input shaft 17 is selectively interconnectible with the interconnecting member 972 through the torque-transmitting mechanism 950 and selectively interconnectible with the sun gear member 932 through the torque-transmitting mechanism 952. The sun gear member 932 is selectively interconnectible with the output shaft 19 through the torque-transmitting mechanism 954. The sun gear member 932 is selectively interconnectible with the interconnecting member 970 through the torque-transmitting mechanism 956. The interconnecting member 970 is selectively interconnectible with the transmission housing 62 through the torque-transmitting mechanism 960. The interconnecting member 972 is selectively interconnectible with the transmission housing 62 through the torque-transmitting mechanism 958.

The truth table of FIG. 20 describes the engagement combinations as well as the engagement sequence for the torque-transmitting mechanisms in order to establish seven forward speed ratios and one reverse speed ratio in the planetary gear arrangement 918. The truth table also provides a numerical example of the speed ratios that are available with the planetary gear arrangement 918 when the ring gear/sun gear tooth ratios of the planetary gearsets 920, 930, and 940 are as shown in FIG. 20 as R1/S1, R2/S2, and R3/S3, respectively. The chart in FIG. 20 provides numerical examples for the ratio steps between adjacent forward speed ratios, between the reverse and first forward speed ratios, and the overall ratio spread of the forward speed ratios.

Upon reviewing the truth table engagement combinations in the planetary gear arrangement 918, those skilled in the art will recognize that the numerical value of the reverse speed ratio is determined by the ring gear/sun gear tooth ratio of the planetary gearset 920. The numerical values of the first forward speed ratio, the fifth forward speed ratio, and the seventh forward speed ratio are determined by the ring gear/sun gear tooth ratios of all three planetary gearsets 920, 930, and 940. The numerical value of the second forward speed ratio is determined by the ring gear/sun gear tooth ratios of the planetary gearsets 920 and 930. The numerical value of the third forward speed ratio is one. The numerical value of the fourth forward speed ratio and the sixth forward speed ratio are determined by the ring gear/sun gear tooth ratios of the planetary gearsets 920 and 940.

Figures 21, 22:
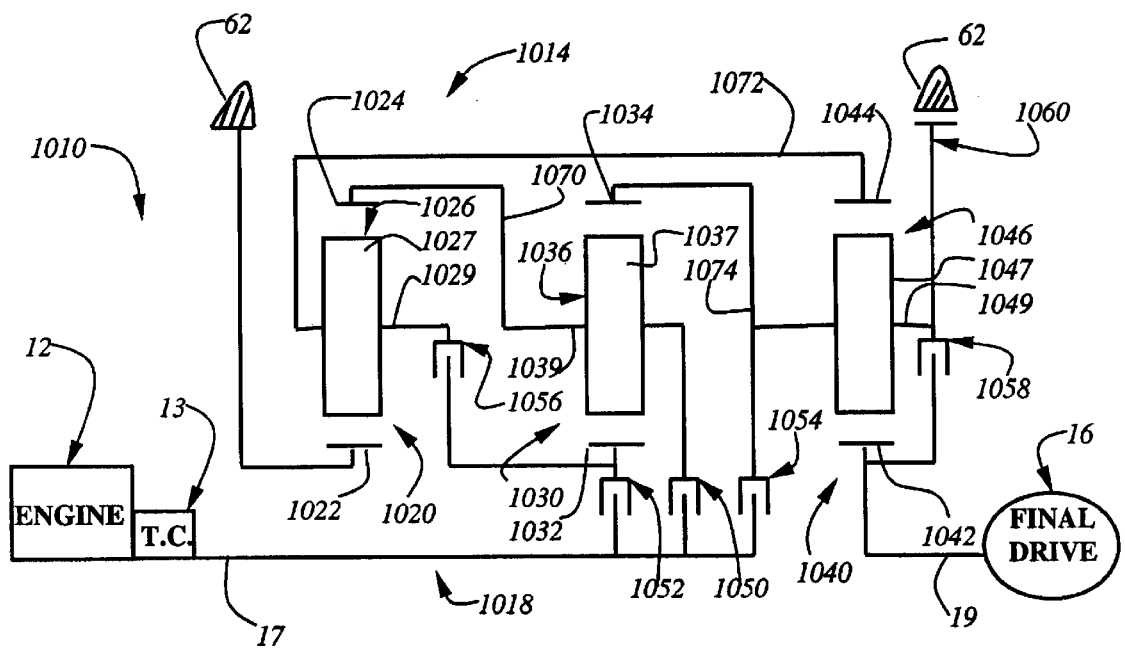
FIG. 21 is a schematic representation of a powertrain having another embodiment of the present invention incorporated therein.
FIG. 22 is a truth table and chart depicting some of the operating parameters of the embodiment shown in FIG. 21.

A powertrain 1010, shown in FIG. 21, includes the engine 12, the starting device 13, a planetary transmission 1014, and the final drive mechanism 16. The planetary transmission 1014 includes the input shaft 17, a planetary gear arrangement 1018, and the output shaft 19. The planetary gear arrangement 1018 includes three planetary gearsets 1020, 1030, and 1040, five rotating type torque-transmitting mechanisms 1050, 1052, 1054, 1056, 1058, and one stationary type torque-transmitting mechanism 1060.

The planetary gearset 1020 includes a sun gear member 1022, a ring gear member 1024, and a planet carrier assembly member 1026. The planet carrier assembly member 1026 includes a plurality of pinion gears 1027 rotatably mounted on a planet carrier 1029 and disposed in meshing relationship with the sun gear member 1022 and the ring gear member 1024.

The planetary gearset 1030 includes a sun gear member 1032, a ring gear member 1034, and a planet carrier assembly member 1036. The planet carrier assembly member 1036 includes a plurality of pinion gears 1037 rotatably mounted on a planet carrier 1039 and disposed in meshing relationship with the sun gear member 1032 and the ring gear member 1034.

The planetary gearset 1040 includes a sun gear member 1042, a ring gear member 1044, and a planet carrier assembly member 1046. The planet carrier assembly member 1046 includes a plurality of pinion gears 1047 rotatably mounted on a planet carrier 1049 and disposed in meshing relationship with the sun gear member 1042 and the ring gear member 1044.

The ring gear member 1024 and planet carrier assembly member 1036 are continuously interconnected by an interconnecting member 1070. The planet carrier assembly member 1026 and ring gear member 1044 are continuously interconnected by an interconnecting member 1072. The ring gear member 1034 and planet carrier assembly member 1046 are continuously interconnected by an interconnecting member 1074. The sun gear member 1022 is continuously connected with the transmission housing 62. The sun gear member 1042 is continuously connected with the output shaft 19.

The input shaft 17 is selectively interconnectible with the interconnecting member 1070 through the torque-transmitting mechanism 1050, selectively interconnectible with the sun gear member 1032 through the torque-transmitting mechanism 1052, and selectively interconnectible with the interconnecting member 1074 through the torque-transmitting mechanism 1054. The sun gear member 1032 is selectively interconnectible with the interconnecting member 1072 through the torque-transmitting mechanism 1056. The interconnecting member 1074 is selectively interconnectible with the sun gear member 1042 and output shaft 19 through the torque-transmitting mechanism 1058, and selectively interconnectible with the transmission housing 62 through the torque-transmitting mechanism 1060.

The truth table of FIG. 22 describes the engagement combinations and sequence for the torque-transmitting mechanisms in order to establish seven forward speed ratios and one reverse speed ratio within the planetary gear arrangement 1018. Also provided in the truth table is an example of numerical values for these speed ratios. These numerical values are determined utilizing the ring gear/sun gear tooth ratios of the planetary gearsets 1020, 1030, and 1040, which are given by way of example as R1/S1, R2/S2, and R3/S3. Also given in FIG. 22 is a chart, which provides numerical values for the ratio steps between the reverse and first forward speed ratio, the adjacent forward speed ratios, and the overall ratio spread of the forward speed ratios.

Those skilled in the art, upon reviewing the engagement combinations in the planetary gear arrangement 1018, will be aware that the numerical value of the reverse speed ratio, the fifth forward speed ratio, the sixth forward speed ratio, and the seventh forward speed ratio are determined by the ring gear/sun gear tooth ratios of all three planetary gearsets 1020, 1030, and 1040. The numerical value of the first forward speed ratio is determined by the ring gear/sun gear tooth ratios of the planetary gearsets 1020 and 1030. The numerical value of the second forward speed ratio is determined by the ring gear/sun gear tooth ratio of the planetary gearset 1020. The third forward speed ratio has a numerical value of one. The numerical value of the fourth forward speed ratio is determined by the ring gear/sun gear tooth ratios of the planetary gearsets 1020 and 1040.

Figures 23, 24:
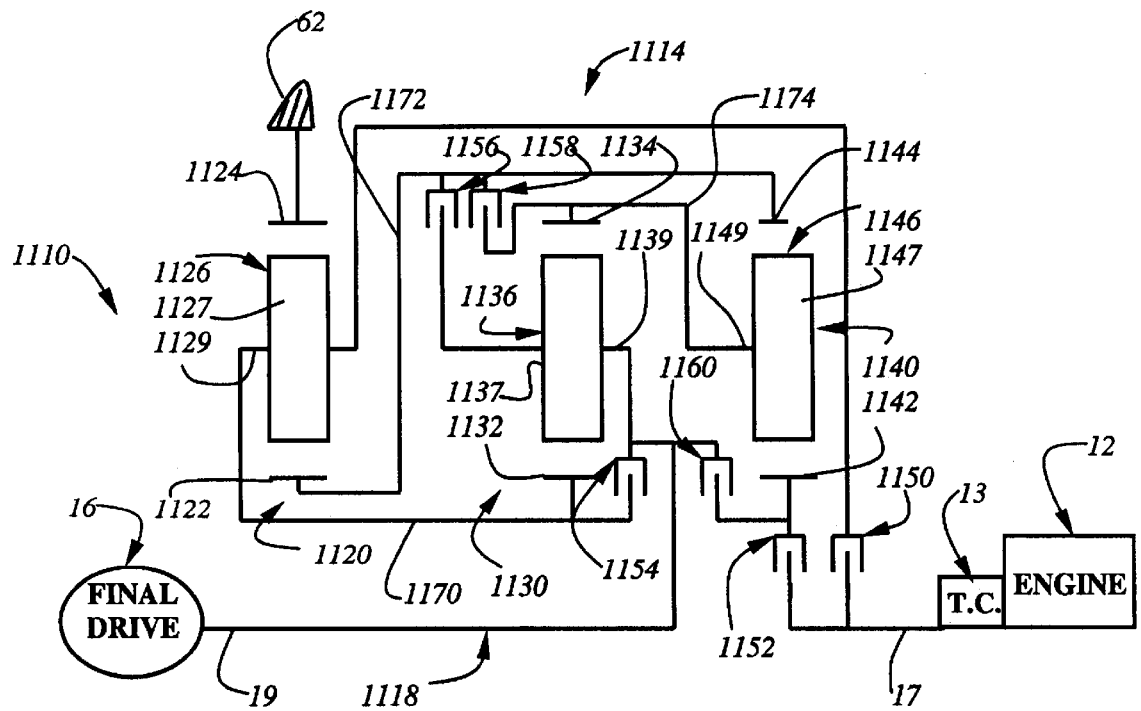
FIG. 23 is a schematic representation of a powertrain having another embodiment of the present invention incorporated therein.
FIG. 24 is a truth table and chart depicting some of the operating parameters of the embodiment shown in FIG. 23.

A powertrain 1110, shown in FIG. 23, includes the engine 12, the starting device 13, a planetary transmission 1114, and the final drive mechanism 16. The planetary transmission 1114 includes the input shaft 17, a planetary gear arrangement 1118, and the output shaft 19. The planetary gear arrangement 1118 includes three planetary gearsets 1120, 1130, and 1140, six rotating type torque-transmitting mechanisms 1150, 1152, 1154, 1156, 1158, and 1160.

The planetary gearset 1120 includes a sun gear member 1122, a ring gear member 1124, and a planet carrier assembly member 1126. The planet carrier assembly member 1126 includes a plurality of pinion gears 1127 rotatably mounted on a planet carrier 1129 and disposed in meshing relationship with the sun gear member 1122 and the ring gear member 1124.

The planetary gearset 1130 includes a sun gear member 1132, a ring gear member 1134, and a planet carrier assembly member 1136. The planet carrier assembly member 1136 includes a plurality of pinion gears 1137 rotatably mounted on a planet carrier 1139 and disposed in meshing relationship with the sun gear member 1132 and the ring gear member 1134.

The planetary gearset 1140 includes a sun gear member 1142, a ring gear member 1144, and a planet carrier assembly member 1146. The planet carrier assembly member 1146 includes a plurality of pinion gears 1147 rotatably mounted on a planet carrier 1149 and disposed in meshing relationship with the sun gear member 1142 and the ring gear member 1144.

The planet carrier assembly member 1126 is continuously interconnected with the sun gear member 1132 through an interconnecting member 1170. The sun gear member 1122 is continuously interconnected with the ring gear member 1144 through an interconnecting member 1172. The ring gear member 1134 is continuously interconnected with the planet carrier assembly member 1146 through an interconnecting member 1174. The ring gear member 1124 is continuously interconnected with the transmission housing 62. The output shaft 19 is continuously interconnected with the planet carrier assembly member 1136.

The input shaft 17 is selectively interconnectible with the interconnecting member 1170 through the torque-transmitting mechanism 1150 and selectively interconnectible with the sun gear member 1142 through the torque-transmitting mechanism 1152. The interconnecting member 1170 is selectively interconnectible with the planet carrier assembly member 1136 through the torque-transmitting mechanism 1154. The interconnecting member 1172 is selectively interconnectible with the planet carrier assembly member 1136 through the torque-transmitting mechanism 1156 and selectively interconnectible with the interconnecting member 1174 through the torque-transmitting mechanism 1158. The sun gear member 1142 is selectively interconnectible with the planet carrier assembly member 1136 and output shaft 19 through the torque-transmitting mechanism 1160.

The truth table shown in FIG. 24 describes the combination of engagements as well as the engagement sequence for the torque-transmitting mechanisms in order to establish seven forward speed ratios and one reverse speed ratio in the planetary gear arrangement 1118. A numerical example for the speed ratios is also given in the truth table. These numerical examples are established using the ring gear/sun gear tooth ratios of the planetary gearsets 1120, 1130, and 1140, shown as R1/S1, R2/S2, and R3/S3, respectively. Also given in FIG. 24 is a chart, which describes the numerical values of the ratio steps between adjacent forward speed ratios, the reverse-to-first forward speed ratio, and the overall ratio spread of the forward speed ratios.

Those skilled in the art, upon reviewing the truth table and planetary gear arrangement 1118, will recognize that the numerical value of the reverse speed ratio is determined by the ring gear/sun gear tooth ratios of the planetary gearsets 1120 and 1140. The numerical value of the first forward speed ratio, the fourth forward speed ratio, and the fifth forward speed ratio, are determined by the ring gear/sun gear tooth ratios of all three planetary gearsets 1120, 1130, and 1140. The numerical value of the second forward speed ratio and the sixth forward speed ratio are determined by the ring gear/sun gear tooth ratios of the planetary gearsets 1120 and 1130. The numerical value of the third forward speed ratio is one. The numerical value of the seventh forward speed ratio is determined by the ring gear/sun gear tooth ratio of the planetary gearset 1120.

Figures 25, 26:
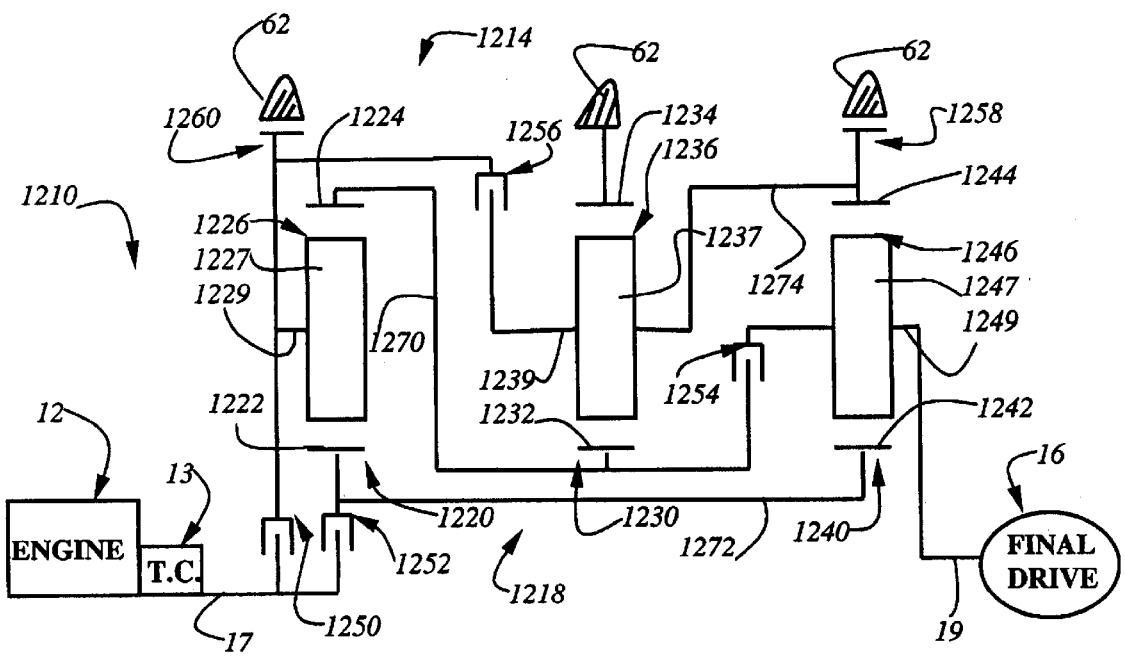
FIG. 25 is a schematic representation of a powertrain having another embodiment of the present invention incorporated therein.
FIG. 26 is a truth table and chart depicting some of the operating parameters of the embodiment shown in FIG. 25.

A powertrain 1210, shown in FIG. 25, includes the engine 12, the starting device 13, a planetary transmission 1214, and the final drive mechanism 16. The planetary transmission 1214 includes the input shaft 17, a planetary gear arrangement 1218, and the output shaft 19. The planetary gear arrangement 1218 includes three planetary gearsets 1220, 1230, and 1240, four rotating type torque-transmitting mechanisms 1250, 1252, 1254, and 1256, and two stationary type torque-transmitting mechanisms 1258 and 1260.

The planetary gearset 1220 includes a sun gear member 1222, a ring gear member 1224, and a planet carrier assembly member 1226. The planet carrier assembly member 1226 includes a plurality of pinion gears 1227 rotatably mounted on a planet carrier 1229 and disposed in meshing relationship with the sun gear member 1222 and the ring gear member 1224.

The planetary gearset 1230 includes a sun gear member 1232, a ring gear member 1234, and a planet carrier assembly member 1236. The planet carrier assembly member 1236 includes a plurality of pinion gears 1237 rotatably mounted on a planet carrier 1239 and disposed in meshing relationship with the sun gear member 1232 and the ring gear member 1234.

The planetary gearset 1240 includes a sun gear member 1242, a ring gear member 1244, and a planet carrier assembly member 1246. The planet carrier assembly member 1246 includes a plurality of pinion gears 1247 rotatably mounted on a planet carrier 1249 and disposed in meshing relationship with the sun gear member 1242 and the ring gear member 1244.

The ring gear member 1224 is continuously interconnected with the sun gear member 1232 through an interconnecting member 1270. The sun gear member 1222 is continuously interconnected with the sun gear member 1242 through an interconnecting member 1272. The planet carrier assembly member 1236 is continuously interconnected with the ring gear member 1244 through an interconnecting member 1274. The ring gear member 1234 is continuously interconnected with the transmission housing 62. The output shaft 19 is continuously interconnected with the planet carrier assembly member 1246.

The input shaft 17 is selectively interconnectible with the planet carrier assembly member 1226 through the torque-transmitting mechanism 1250 and selectively interconnectible with the interconnecting member 1272 through the torque-transmitting mechanism 1252. The interconnecting member 1270 is selectively interconnectible with the planet carrier assembly member 1246 and output shaft 19 through the torque-transmitting mechanism 1254. The planet carrier assembly member 1226 is selectively interconnectible with the interconnecting member 1274 through the torque-transmitting mechanism 1256 and selectively interconnectible with the transmission housing 62 through the torque-transmitting mechanism 1260. The interconnecting member 1274 is selectively interconnectible with the transmission housing 62 through the torque-transmitting mechanism 1258.

The truth table shown in FIG. 26 describes the engagement combinations and sequence for the torque-transmitting mechanisms in order to establish seven forward speed ratios and one reverse speed ratio in the planetary gear arrangement 1218. The truth table also provides a numerical example of the speed ratios that can be obtained in the planetary gear arrangement 1218 when the ring gear/sun gear tooth ratios of the planetary gearsets 1220, 1230, and 1240 are chosen as represented by R1/S1, R2/S2, and R3/S3, respectively. A chart in FIG. 26 provides the numerical value for the ratio steps between adjacent forward speed ratios, between the reverse and first forward speed ratio, and the overall ratio spread of the forward speed ratios.

Upon reviewing the truth table and planetary gear arrangement 1218, those skilled in the art will recognize that the numerical value of the reverse speed ratio, the first forward speed ratio, the second forward speed ratio, and the sixth forward speed ratio are determined by the ring gear/sun gear tooth ratios of all three planetary gearsets 1220, 1230, and 1240. The numerical value of the third forward speed ratio is determined by the ring gear/sun gear tooth ratio of the planetary gearset 1240. The numerical value of the fourth forward speed ratio and the fifth forward speed ratio are determined by the ring gear/sun gear tooth ratios of the planetary gearsets 1230 and 1240. The numerical value of the seventh forward speed ratio is determined by the ring gear/sun gear tooth ratios of the planetary gearset 1220 and 1240.

As is evident from the numerical values given, the planetary gear arrangement 1218 does not provide a direct or 1:1 ratio in any of the forward speeds. Also, it is noted that the planetary gear arrangement 1218 provides six underdrive ratios and one overdrive ratio.

Figures 27, 28:
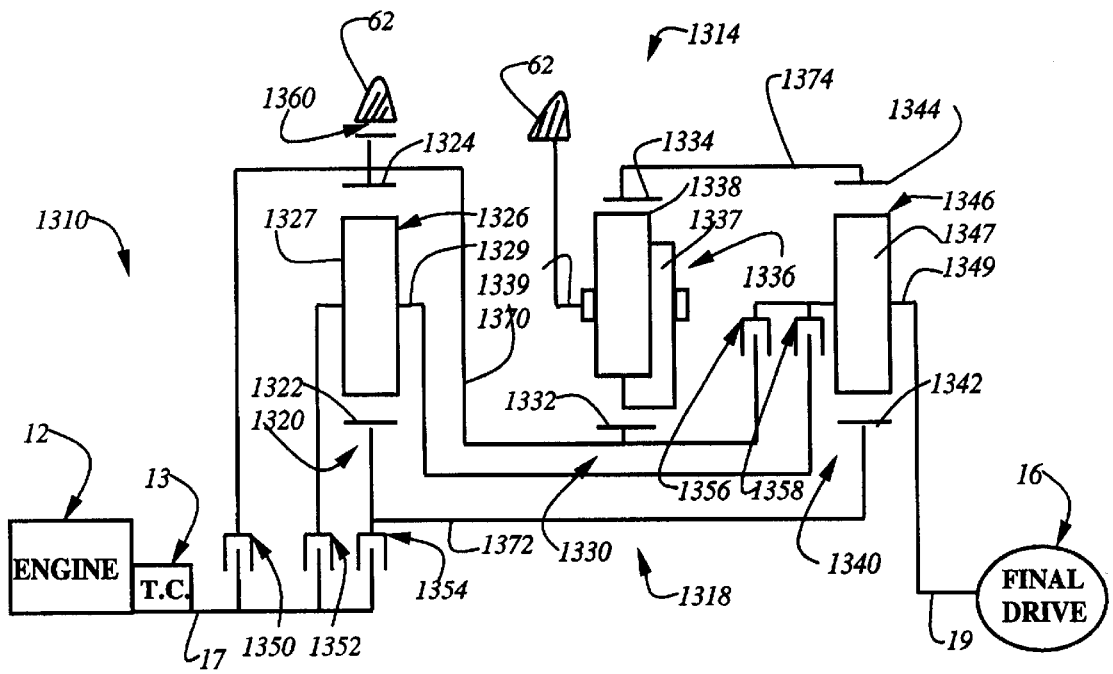
FIG. 27 is a schematic representation of a powertrain having another embodiment of the present invention incorporated therein.
FIG. 28 is a truth table and chart depicting some of the operating parameters of the embodiment shown in FIG. 27.

A powertrain 1310, shown in FIG. 27, includes the engine 12, the starting device 13, a planetary transmission 1314, and the final drive mechanism 16. The planetary transmission 1314 includes the input shaft 17, a planetary gear arrangement 1318, and the output shaft 19. The planetary gear arrangement 1318 includes three planetary gearsets 1320, 1330, and 1340, five rotating type torque-transmitting mechanisms 1350, 1352, 1354, 1356 and 1358, and one stationary type torque-transmitting mechanism 1360.

The planetary gearset 1320 includes a sun gear member 1322, a ring gear member 1324, and a planet carrier assembly member 1326. The planet carrier assembly member 1326 includes a plurality of pinion gears 1327 rotatably mounted on a planet carrier 1329 and disposed in meshing relationship with the sun gear member 1322 and the ring gear member 1324.

The planetary gearset 1330 includes a sun gear member 1332, a ring gear member 1334, and a planet carrier assembly member 1336. The planet carrier assembly member 1336 includes a plurality of pairs of intermeshing pinion gears 1337 and 1338 that are rotatably mounted on a planet carrier 1339 and disposed in meshing relationship with the sun gear member 1332 and the ring gear member 1334.

The planetary gearset 1340 includes a sun gear member 1342, a ring gear member 1344, and a planet carrier assembly member 1346. The planet carrier assembly member 1346 includes a plurality of pinion gears 1347 rotatably mounted on a planet carrier 1349 and disposed in meshing relationship with the sun gear member 1342 and the ring gear member 1344.

It will be noted that the planetary gearset 1330 is a compound or double pinion type planetary gearset. A double pinion planetary gearset has a feature that when the carrier member of the planet carrier assembly member is held stationary, the sun gear member and ring gear member will rotate in the same direction.

The ring gear member 1324 and sun gear member 1332 are continuously interconnected by an interconnecting member 1370. The sun gear member 1322 and sun gear member 1342 are continuously interconnected by an interconnecting member 1372. The ring gear members 1334 and 1344 are continuously interconnected by an interconnecting member 1374. The planet carrier assembly member 1336 is continuously connected with the transmission housing 62. The output shaft 19 is continuously connected with the planet carrier assembly member 1346, selectively connectible with the interconnecting member 1370 through the torque-transmitting mechanism 1356, and selectively interconnectible with the planet carrier assembly member 1326 through the torque-transmitting mechanism 1358.

The input shaft 17 is selectively interconnectible with the interconnecting member 1370 through the torque-transmitting mechanism 1350, selectively interconnectible with the planet carrier assembly member 1326 through the torque-transmitting mechanism 1352, and selectively interconnectible with the interconnecting member 1372 through the torque-transmitting mechanism 1354. The interconnecting member 1370 is selectively interconnectible with the transmission housing 62 through the torque-transmitting mechanism 1360.

The truth table of FIG. 28 describes the engagement combinations and sequence for the torque-transmitting mechanisms in order to establish seven forward speed ratios and one reverse speed ratio between input shaft 17 and the output shaft 19 through the planetary gear arrangement 1318. The truth table also provides a numerical example for possible speed ratios for the seven forward speed ratios as well as the reverse speed ratio when the ring gear/sun gear tooth ratios of the planetary gearsets 1320, 1330, and 1340 are as given as R1/S1, R2/S2, and R3/S3, respectively. A chart in FIG. 28 describes the numerical values for the ratio steps between the reverse and first forward speed ratio, between the adjacent forward speed ratios, and the overall ratio spread of the forward speed ratios.

Those skilled in the art, upon reviewing the engagement combinations and the interconnections of the planetary gear arrangement 1318, will be aware that the numerical value of the reverse speed ratio, the first forward speed ratio, the fourth forward speed ratio, and the fifth forward speed ratio are determined by the ring gear/sun gear tooth ratios of all three planetary gearsets 1320, 1330, and 1340. The numerical value of second forward speed ratio and the sixth are determined by the ring gear/sun gear tooth ratios of the planetary gearsets 1320 and 1340. The numerical value of the third forward speed ratio is determined by the ring gear/sun gear tooth ratios of the planetary gearsets 1330 and 1340. The numerical value of the seventh forward speed ratio is one.

The family member described in FIG. 27 has no overdrive ratios, six underdrive ratios, and a direct drive ratio.

Figures 29, 30:
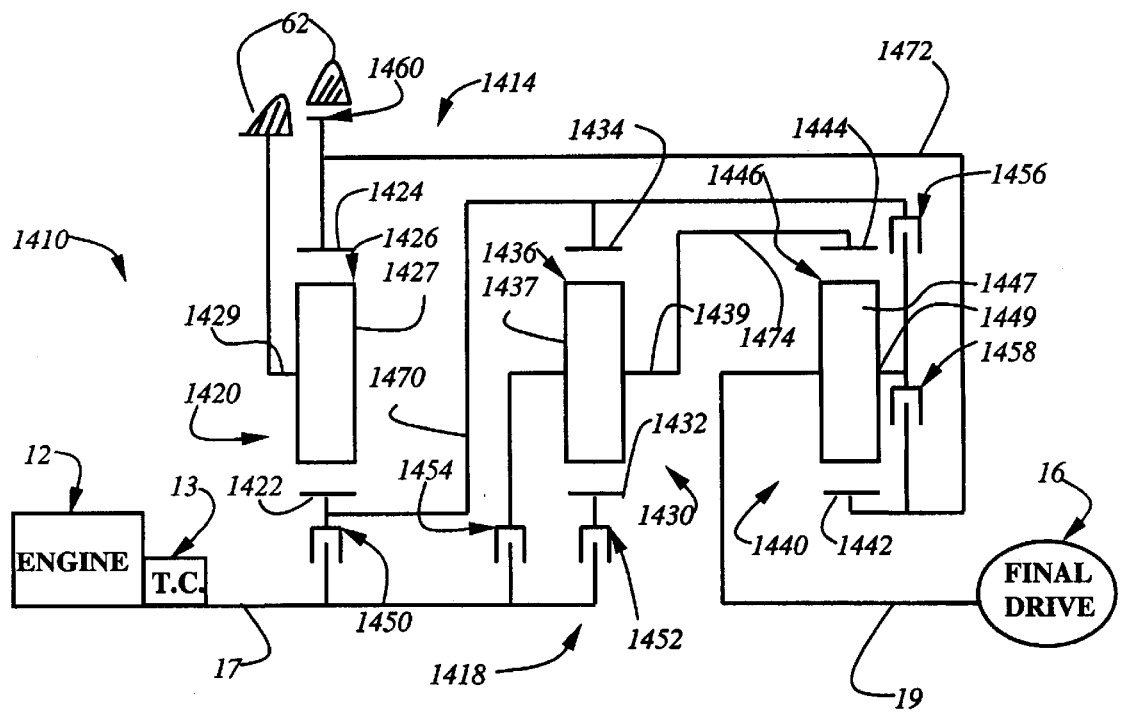
FIG. 29 is a schematic representation of a powertrain having another embodiment of the present invention incorporated therein.
FIG. 30 is a truth table and chart depicting some of the operating parameters of the embodiment shown in FIG. 29.

A powertrain 1410, shown in FIG. 29, includes the engine 12, the starting device 13, a planetary transmission 1414, and the final drive mechanism 16. The planetary transmission 1414 includes the input shaft 17, a planetary gear arrangement 1418, and the output shaft 19. The planetary gear arrangement 1418 includes three planetary gearsets 1420, 1430, and 1440, five rotating type torque-transmitting mechanisms 1450, 1452, 1454, 1456 and 1458, and one stationary type torque-transmitting mechanism 1460.

The planetary gearset 1420 includes a sun gear member 1422, a ring gear member 1424, and a planet carrier assembly member 1426. The planet carrier assembly member 1426 includes a plurality of pinion gears 1427 rotatably mounted on a planet carrier 1429 and disposed in meshing relationship with the sun gear member 1422 and the ring gear member 1424.

The planetary gearset 1430 includes a sun gear member 1432, a ring gear member 1434, and a planet carrier assembly member 1436. The planet carrier assembly member 1436 includes a plurality of pinion gears 1437 rotatably mounted on a planet carrier 1439 and disposed in meshing relationship with the sun gear member 1432 and the ring gear member 1434.

The planetary gearset 1440 includes a sun gear member 1442, a ring gear member 1444, and a planet carrier assembly member 1446. The planet carrier assembly member 1446 includes a plurality of pinion gears 1447 rotatably mounted on a planet carrier 1449 and disposed in meshing relationship with the sun gear member 1442 and the ring gear member 1444.

The sun gear member 1422 and ring gear member 1434 are continuously interconnected by an interconnecting member 1470. The ring gear member 1424 and sun gear member 1442 are continuously interconnected by an interconnecting member 1472. The planet carrier assembly member 1436 and ring gear member 1444 are continuously interconnected by an interconnecting member 1474. The planet carrier assembly member 1426 is continuously connected with the transmission housing 62. The planet carrier assembly member 1446 is continuously interconnected with the output shaft 19.

The input shaft 17 is selectively interconnectible with the interconnecting member 1470 through the torque-transmitting mechanism 1450, selectively interconnectible with the sun gear member 1432 through the torque-transmitting mechanism 1452, and selectively interconnectible with interconnecting member 1474 through the torque-transmitting mechanism 1454. The output shaft 19 and planet carrier assembly member 1446 are selectively interconnectible with the interconnecting member 1470 through the torque-transmitting mechanism 1456 and selectively interconnectible with the interconnecting member 1472 through the torque-transmitting mechanism 1458. The interconnecting member 1472 is selectively interconnectible with the transmission housing 62 through the torque-transmitting mechanism 1460.

The torque-transmitting mechanisms are engaged in combinations of two, as shown in the truth table of FIG. 30. The truth table also describes the sequence of engagements for the torque-transmitting mechanisms, such that seven forward speed ratios and one reverse speed ratio are established in the planetary gear arrangement 1418. Also given in the truth table is an example of the numerical values for the seven forward speed ratios and the reverse speed ratio. These numerical values are determined by the ring gear/sun gear tooth ratios of the planetary gearsets 1420, 1430, and 1440, which are given by way of example as R1/S1, R2/S2, and R3/S3, respectively. A chart shown in FIG. 30 provides the numerical examples of the ratio steps between adjacent forward speed ratios, the ratio step between the reverse and first forward speed ratio, and the overall ratio spread of the forward speed ratios.

Those skilled in the art will, upon reviewing the engagement combinations in the truth table and the interconnections of the planetary gear arrangement 1418, be aware that the numerical value of the reverse speed ratio is determined by the ring gear/sun gear tooth ratio of the planetary gearset 1420. The numerical value of the first forward speed ratio and the third forward speed ratio are determined by the ring gear/sun gear tooth ratios of all three planetary gearsets 1420, 1430, and 1440. The numerical value of the second forward speed ratio is determined by the ring gear/sun gear tooth ratios of the planetary gearsets 1430 and 1440. The numerical value of the fourth forward speed ratio and the fifth forward speed ratio are determined by the ring gear/sun gear tooth ratios of the planetary gearsets 1420 and 1440. The numerical value of the sixth forward speed ratio is determined by the ring gear/sun gear tooth ratio of the planetary gearset 1440. The numerical value of the seventh forward speed ratio is one.

The family member described in FIG. 29, as with the family member described in FIG. 27, does not have an overdrive ratio but does have six underdrive ratios and one direct drive ratio.

Figures 31, 32:
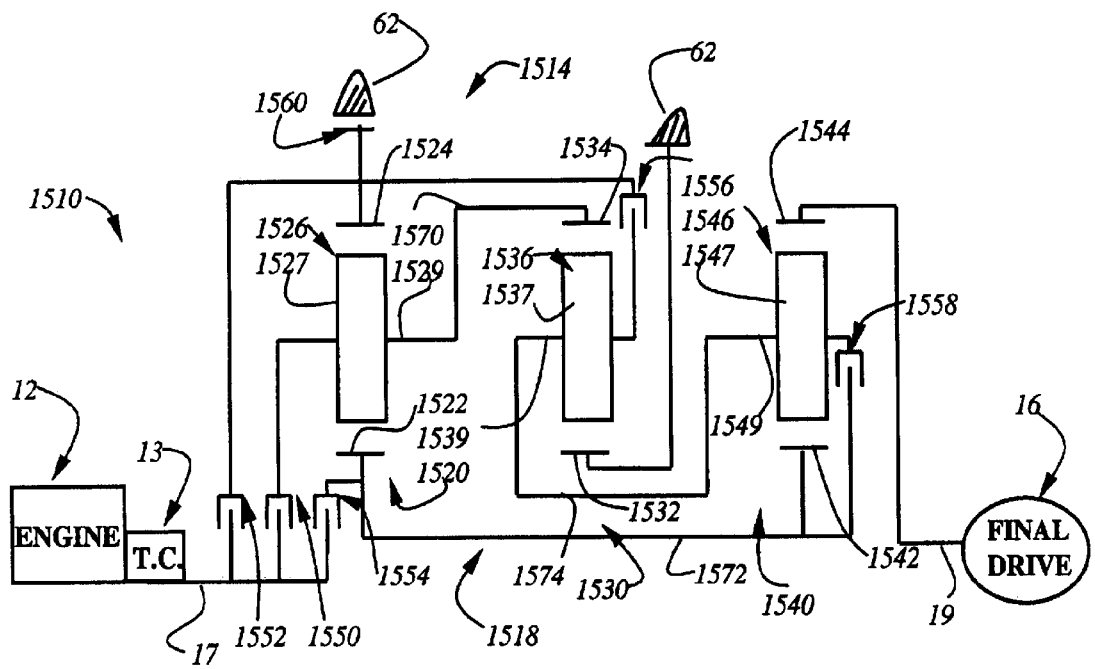
FIG. 31 is a schematic representation of a powertrain having another embodiment of the present invention incorporated therein.
FIG. 32 is a truth table and chart depicting some of the operating parameters of the embodiment shown in FIG. 31.

A powertrain 1510, shown in FIG. 31, includes the engine 12, the starting device 13, a planetary transmission 1514, and the final drive mechanism 16. The planetary transmission 1514 includes the input shaft 17, a planetary gear arrangement 1518, and the output shaft 19. The planetary gear arrangement 1518 includes three planetary gearsets 1520, 1530, and 1540, five rotating type torque-transmitting mechanisms 1550, 1552, 1554, 1556 and 1558, and one stationary type torque-transmitting mechanism 1560.

The planetary gearset 1520 includes a sun gear member 1522, a ring gear member 1524, and a planet carrier assembly member 1526. The planet carrier assembly member 1526 includes a plurality of pinion gears 1527 rotatably mounted on a planet carrier 1529 and disposed in meshing relationship with the sun gear member 1522 and the ring gear member 1524.

The planetary gearset 1530 includes a sun gear member 1532, a ring gear member 1534, and a planet carrier assembly member 1536. The planet carrier assembly member 1536 includes a plurality of pinion gears 1537 rotatably mounted on a planet carrier 1539 and disposed in meshing relationship with the sun gear member 1532 and the ring gear member 1534.

The planetary gearset 1540 includes a sun gear member 1542, a ring gear member 1544, and a planet carrier assembly member 1546. The planet carrier assembly member 1546 includes a plurality of pinion gears 1547 rotatably mounted on a planet carrier 1549 and disposed in meshing relationship with the sun gear member 1542 and the ring gear member 1544.

An interconnecting member 1570 continuously interconnects the planet carrier assembly member 1526 with the ring gear member 1534. An interconnecting member 1574 continuously interconnects the planet carrier assembly member 1536 with the planet carrier assembly member 1546. An interconnecting member 1572 continuously interconnects the sun gear members 1522 and 1542. The sun gear member 1532 is continuously interconnected with the transmission housing 62. The ring gear member 1544 is continuously interconnected with the output shaft 19.

The input shaft 17 is selectively interconnectible with the interconnecting member 1570 through the torque-transmitting mechanism 1550, selectively interconnectible with the ring gear member 1524 through the torque-transmitting mechanism 1552, and selectively interconnectible with the interconnecting member 1572 through the torque-transmitting mechanism 1554. The ring gear member 1524 is selectively interconnectible with the interconnecting member 1574 through the torque-transmitting mechanism 1556. The interconnecting member 1572 is selectively interconnectible with the interconnecting member 1574 through the torque-transmitting mechanism 1558. The ring gear member 1524 is selectively interconnectible with the transmission housing 62 through the torque-transmitting mechanism 1560.

The truth table shown in FIG. 32 describes the engagement combinations, as well as the engagement sequence, for the torque-transmitting mechanisms in order to establish seven forward speed ratios and one reverse speed ratio in the planetary gear arrangement 1518 between the input shaft 17 and the output shaft 19. Also provided in the truth table is a numerical example for each of the forward speed ratios and the reverse speed ratio. These speed ratio values are determined by the ring gear/sun gear tooth ratios of the planetary gearsets 1520, 1530, and 1540 as represented by R1/S1, R2/S2, and R3/S3, respectively. Also given in FIG. 32 is a chart, which provides a numerical example for the ratio steps between the reverse and first forward speed ratio, each of the adjacent forward speed ratios, and the overall ratio spread of the forward speed ratios.

Those skilled in the art, upon reviewing the engagement combinations shown in the truth table, as well as the interconnections provided in the planetary gear arrangement 1518, will recognize that the numerical value of the reverse speed ratio, the first forward speed ratio, the second forward speed ratio, and the third forward speed ratio are determined by the ring gear/sun gear tooth ratios of all three planetary gearsets 1520, 1530, and 1540. The numerical value of the fourth forward speed ratio is determined by the ring gear/sun gear tooth ratios of the planetary gearsets 1530 and 1540. The numerical value of the fifth forward speed ratio is determined by the ring gear/sun gear tooth ratios of the planetary gearsets 1520 and 1530. The numerical value of the sixth forward speed ratio is determined by the ring gear/sun gear tooth ratio of the planetary gearset 1430. The numerical value of the seventh forward speed ratio is one.

The family member described in FIG. 31 for the planetary gear arrangement 1518 also provides six underdrive speed ratios and one direct speed ratio.

In reviewing the above descriptions of the family members shown, it should now be apparent that each of the family members has three planetary gearsets. At least one member of one of the planetary gearsets is continuously connected with the transmission housing and another member of one of the planetary gearsets is continuously connected with the transmission output shaft. The planetary gearsets are interconnected such that a member of the first planetary gearset is continuously connected with a member of the second planetary gearset, another member of the first planetary gearset is connected with a member of the third planetary gearset, and another member of the second planetary gearset is connected with another member of the third planetary gearset. Also provided within each family member are six torque-transmitting mechanisms, which are selectively engaged in combinations of two to establish seven forward speed ratios and one reverse speed ratio in the planetary gear arrangement of each family member.

It should also be apparent that modifications and variations are possible to the family that are not depicted in the above-described embodiments. Therefore, the invention should only be limited by the appended claims.

What is claimed is:

1. A power transmission comprising:
   an input shaft;
   an output shaft;
   a transmission housing;
   a first planetary gearset having first, second, and third members;
   a second planetary gearset having first, second, and third members;
   a third planetary gearset having first, second, and third members;
   a first interconnecting member continuously interconnecting said first member of said first planetary gearset with said first member of said second planetary gearset;
   a second interconnecting member continuously interconnecting said second member of said first planetary gearset with said first member of said third planetary gearset;
   a third interconnecting member continuously interconnecting said second member of said second planetary gearset with said second member of said third planetary gearset;
   said third member of one of said planetary gearsets being continuously interconnected with said transmission housing;
   said output shaft being continuously interconnected with at least one member of one of said planetary gearsets; and
   six torque-transmitting mechanisms being selectively engaged in combinations two to establish at least seven forward speed ratios and one reverse speed ratio within said planetary gearsets between said input shaft and said output shaft where either:
      said first torque-transmitting mechanism selectively interconnecting said input shaft with said third member of said third planetary gearset, said second torque-transmitting mechanism selectively interconnecting said input shaft and said third interconnecting member, said third torque-transmitting mechanism selectively interconnecting said input shaft with said third member of said second planetary gearset, said fourth torque-transmitting mechanism selectively interconnecting said third member of said third planetary gearset with said third interconnecting member, said fifth torque-transmitting mechanism selectively interconnecting said transmission housing with said third member of said third planetary gearset, and said sixth torque-transmitting mechanism selectively interconnecting said transmission housing with said third interconnecting member, or
      said first torque-transmitting mechanism selectively interconnecting said input shaft with said second interconnecting member, said second torque-transmitting mechanism selectively interconnecting said input shaft with said third member of said second planetary gearset, said third torque-transmitting mechanism selectively interconnecting said input shaft with said third member of said third planetary gearset, said fourth torque-transmitting mechanism selectively interconnecting said second interconnecting member with said third interconnecting member, said fifth torque-transmitting mechanism selectively interconnecting said transmission housing with said second interconnecting member, and said sixth torque-transmitting mechanism selectively interconnecting said transmission housing with said third member of said third planetary gearset, or
      said first torque-transmitting mechanism selectively interconnecting said input shaft with said second interconnecting member, said second torque-transmitting mechanism selectively interconnecting said input shaft with said third member of said second planetary gearset, said third torque-transmitting mechanism selectively interconnecting said input shaft with said third member of said third planetary gearset, said fourth torque-transmitting mechanism selectively interconnecting said third member of said third planetary gearset with said second interconnecting member, said fifth torque-transmitting mechanism selectively interconnecting said transmission housing with said first interconnecting member, said sixth torque-transmitting mechanism selectively interconnecting said transmission housing with said third member of said third planetary gearset, or said first torque-transmitting mechanism selectively interconnecting said input shaft with said third member of said second planetary gearset, said second torque-transmitting mechanism selectively interconnecting said input shaft with said third interconnecting member, said third torque-transmitting mechanism selectively interconnecting said input shaft with said third member of said third planetary gearset, said fourth torque-transmitting mechanism selectively interconnecting said first interconnecting member with said third interconnecting member, said fifth torque-transmitting mechanism selectively interconnecting said transmission housing with said third member of said second planetary gearset, and said sixth torque-transmitting mechanism selectively interconnecting said transmission housing with said third interconnecting member, or said first torque-transmitting mechanism selectively interconnecting said input shaft with said first interconnecting member said second torque-transmitting mechanism selectively interconnecting said input shaft with said second interconnecting member, said third torque-transmitting mechanism selectively interconnecting said input shaft with said third member of said second planetary gearset, said fourth torque-transmitting mechanism selectively interconnecting said input shaft with said third member of said third planetary gearset, said fifth torque-transmitting mechanism selectively interconnecting said third member of said third planetary gearset with said second interconnecting member, and said sixth torque-transmitting mechanism selectively interconnecting said transmission housing with said first interconnecting member, or said first torque-transmitting mechanism selectively interconnecting said input shaft with said first interconnecting member, said second torque-transmitting mechanism selectively interconnecting said input shaft with said third interconnecting member, said third torque-transmitting mechanism selectively interconnecting said input shaft with said third member of said third planetary gearset, said fourth torque-transmitting mechanism selectively interconnecting said second interconnecting member with said output shaft, said fifth torque-transmitting-mechanism selectively interconnecting said second interconnecting member with said third interconnecting member, and said sixth torque-transmitting mechanism selectively interconnecting said transmission housing with said first interconnecting member, or first torque-transmitting mechanism selectively interconnecting said input shaft with said second interconnecting member, said second torque-transmitting mechanism selectively interconnecting said input shaft with said third interconnecting member, said third torque-transmitting mechanism selectively interconnecting said input shaft with said third member of said second planetary gearset, said fourth torque-transmitting mechanism selectively interconnecting said first interconnecting member with said output shaft, said fifth torque-transmitting mechanism selectively interconnecting said third member of said second planetary gearset with said first interconnecting member, and said sixth torque-transmitting mechanism selectively interconnecting said transmission housing with said second interconnecting member, or said first toque-transmitting mechanism selectively interconnecting said input shaft with said second interconnecting member, said second torque-transmitting mechanism selectively interconnecting said input shaft with said third interconnecting member, said third torque-transmitting mechanism selectively interconnecting said input shaft with said third member of said second planetary gearset, said fourth torque-transmitting mechanism selectively interconnecting said first interconnecting member with said third interconnecting member, said fifth torque-transmitting mechanism selectively interconnecting said first interconnecting member with said output shaft, and said sixth torque-transmitting mechanism selectively interconnecting said third member of said second planetary gearset with said third interconnecting member, or said first torque-transmitting mechanism selectively interconnecting said input shaft with said first interconnecting member, said second torque-transmitting mechanism selectively interconnecting said input shaft with said second interconnecting member, said third torque-transmitting mechanism selectively interconnecting said input shaft with said third interconnecting member, said fourth torque-transmitting mechanism selectively interconnecting said third member of said second planet gearset with said output shaft, said fifth torque-transmitting mechanism selectively interconnecting said transmission housing with said second interconnecting member, said sixth torque-transmitting mechanism selectively interconnecting said transmission housing with said third interconnecting member, or first torque-transmitting mechanism selectively interconnecting said input shaft with said second interconnecting member, said second torque-transmitting mechanism selectively interconnecting said input shaft with said third member of said second planetary gearset, said third torque-transmitting mechanism selectively interconnecting said third member of said second planetary gearset with said output shaft, said fifth torque-transmitting mechanism selectively interconnecting said transmission housing with said second interconnecting member, and said sixth torque-transmitting mechanism selectively interconnecting said transmission housing with said first interconnecting member, or said first torque-transmitting mechanism selectively interconnecting said input shaft with said first interconnecting member, said second torque-transmitting mechanism selectively interconnecting said input shaft with said third member of said second planetary gearset, said third torque-transmitting mechanism selectively interconnecting said input shaft with said third interconnecting member, said fourth torque-transmitting mechanism selectively interconnecting sad third member of said second planetary gearset with said second interconnecting member, said fifth torque-transmitting mechanism selectively interconnecting said third interconnecting member with said output shaft, and said sixth torque-transmitting mechanism selectively interconnecting said transmission housing with said third interconnecting member, or said first torque-transmitting mechanism selectively interconnecting said input shaft with said first interconnecting member, said second torque-transmitting mechanism selectively interconnecting said input shaft with said third member of said third planetary gearset, said third torque-transmitting mechanism selectively interconnecting said first interconnecting member with said output shaft, said fourth torque-transmitting mechanism selectively interconnecting said second interconnecting member with said output shaft, said fifth torque-transmitting mechanism selectively interconnecting said second interconnecting member with said third interconnecting member, and said sixth torque-transmitting mechanism selectively interconnecting said third member of said third planetary gearset with said output shaft, or said first torque-transmitting mechanism selectively interconnecting said input shaft with said third member of said first planetary gearset, said second torque-transmitting mechanism selectively interconnecting said input shaft with said second interconnecting member, said third torque-transmitting mechanism selectively interconnecting said first interconnecting member with said output shaft, said fourth torque-transmitting mechanism selectively interconnecting said third member of said first planetary gearset with said third interconnecting member, said fifth torque-transmitting mechanism selectively interconnecting said transmission housing with said third interconnecting member, and said sixth torque-transmitting mechanism selectively interconnecting said transmission housing with said third member of said first planetary gearset, or said first torque-transmitting mechanism selectively interconnecting said input shaft with said first interconnecting member, said second torque-transmitting mechanism selectively interconnecting said input shaft with said third member of said first planetary gearset, said third torque-transmitting mechanism selectively interconnecting said input shaft with said second interconnecting member, said fourth torque-transmitting mechanism selectively interconnecting said first interconnecting member with said output shaft, said fifth torque-transmitting mechanism selectively interconnecting said third member of said first planetary gearset with said output shaft, and said sixth torque-transmitting mechanism selectively interconnecting said transmission housing with said first interconnecting member, or said first torque-transmitting mechanism selectively interconnecting said input shaft with said first interconnecting member, said second torque-transmitting mechanism selectively interconnecting said input shaft with said third member of said second planetary gearset, said third torque-transmitting mechanism selectively interconnecting said input shaft with said third interconnecting member, said fourth torque-transmitting mechanism selectively interconnecting said first interconnecting member with said output shaft, said fifth torque-transmitting mechanism selectively interconnecting said second interconnecting member with said output shaft, and said sixth torque-transmitting mechanism selectively interconnecting said transmission housing with said second interconnecting member, or said first torque-transmitting mechanism selectively interconnecting said input shaft with said first interconnecting member, said second torque-transmitting mechanism selectively interconnecting said input shaft with said third member of said first planetary gearset, said third torque-transmitting mechanism selectively interconnecting said input shaft with said second interconnecting member, said fourth torque-transmitting mechanism selectively interconnecting said third member of said first planetary gearset with said third interconnecting member, said fifth torque-transmitting mechanism selectively interconnecting said second interconnecting member with said third interconnecting member, and said sixth torque-transmitting mechanism selectively interconnecting said transmission housing with said third member of said first planetary gearset.

2. The transmission defined in claim 1 further comprising:

said first members of said first, second, and third planetary gearsets being a member selected from a first group consisting of a sun gear member, a ring gear member, and a planet carrier assembly member;

said second members of said first, second, and third planetary gearsets being a member of a second group consisting of a sun gear member, a ring gear member, and a planet carrier assembly member not selected as said first member; and said third members of said first, second, and third planetary gearsets being a member of a third group consisting of a sun gear member, a ring gear member, and a planet carrier assembly member not selected as either said first member or said second member.

3. A power transmission comprising:

an input shaft;

an output shaft;

a transmission housing;

a first planetary gearset having first, second, and third members;

a second planetary gearset having first, second, and third members;

a third planetary gearset having first, second, and third members;

a first interconnecting member continuously interconnecting said first member of said first planetary gear with said first member of said second planetary gearset;

a second interconnecting member continuously interconnecting said second member of said first planetary gearset with said first member of said third planetary gearset;

a third interconnecting member continuously interconnecting said second member of said second planetary gearset with said second member of said third planetary gearset;

said transmission housing being continuously interconnected with at least one member of said planetary gearsets;

said output shaft being continuously interconnected with at least one member of one of said planetary gearsets that is not connected with said housing; and six selectively engageable torque transmitting mechanisms being selectively engaged in combinations of two to establish at least seven forward speed ratios and one reverse speed ratio between said input shaft and said output shaft.

4. The power transmission defined in claim 3 further comprising:

said first members of said first, second, and third planetary gearsets being a member selected from a first group consisting of a sun gear member, a ring gear member, and a planet carrier assembly member;

said second members of said first, second, and third planetary gearsets being a member of a second group consisting of a sun gear member, a ring gear member, and a planet carrier assembly member not selected as said first member; and said third members of said first, second, and third planetary gearsets being a member of a third group consisting of a sun gear member, a ring gear member, and a planet carrier assembly member not selected as either said first member or said second member.

5. A power transmission comprising:

an input shaft;

an output shaft;

a transmission housing;

a first planetary gearset having first, second, and third members;

a second planetary gearset having first, second, and third members;

a third planetary gearset having first, second, and third members;

a first interconnecting member continuously interconnecting said first member of said first planetary gearset with said first member of said second planetary gearset;

a second interconnecting member continuously interconnecting said second member of said first planetary gearset with said first member of said third planetary gearset;

a third interconnecting member continuously interconnecting said second member of said second planetary gearset with said second member of said third planetary gearset;

said transmission housing being continuously interconnected with a member of one said planetary gearsets;

said output shaft being continuously interconnected with at least one member of one of said planetary gearsets that is not connected with said housing;

and six torque-transmitting mechanisms selectively operable in combinations of two to establish at least seven forward speed ratios and one reverse speed ratio wherein either:

said first torque-transmitting mechanism selectively interconnecting said third member of said first planetary gearset with said input shaft, said second torque-transmitting mechanism selectively interconnecting said input shaft with said third interconnecting member, said third torque-transmitting mechanism selectively interconnecting said input shaft with said third member of said second planetary gearset, said fourth torque-transmitting mechanism selectively interconnecting said third member of said second planetary gearset with said third interconnecting member, said fifth torque-transmitting mechanism selectively interconnecting said transmission housing with said third member of said third planetary gearset, and said sixth torque-transmitting mechanism selectively interconnecting said transmission housing with said third interconnecting member, or said first torque-transmitting mechanism selectively interconnecting said second interconnecting member with said input shaft, said second torque-transmitting mechanism selectively interconnecting said third member of said second planetary gearset with said input shaft, said third torque-transmitting mechanism selectively interconnecting said input shaft with said third member of said third planetary gearset, said fourth torque-transmitting mechanism selectively interconnecting said second interconnecting member with said third interconnecting member, said fifth torque-transmitting mechanism selectively interconnecting said transmission housing with said second interconnecting member, said sixth torque-transmitting mechanism selectively interconnecting said transmission housing with said third member of said second planetary gears, or said fourth torque-transmitting mechanism selectively interconnecting third member of said third planetary gearset with said second interconnecting member, said fifth torque-transmitting mechanism selectively interconnecting said transmission housing with said first interconnecting member, and said sixth torque-transmitting mechanism selectively interconnecting said transmission housing with said third member of said second planetary gearset, or said third torque-transmitting mechanism selectively interconnecting said third member of said second planetary gearset with said third member of said first planetary gearset, said fourth torque-transmitting mechanism selectively interconnecting said third member of said second planetary gearset with said first interconnecting member, said fifth torque-transmitting mechanism selectively interconnecting said transmission housing with said second interconnecting member, and said sixth torque-transmitting mechanism selectively interconnecting said transmission housing with said first interconnecting member, or said second torque-transmitting mechanism selectively interconnecting said third interconnecting member with said input shaft, said third torque-transmitting mechanism selectively interconnecting said input shaft with said third member of said second planetary gearset, said fourth torque-transmitting mechanism selectively interconnecting said first interconnecting member with said third interconnecting member, said fifth torque-transmitting mechanism selectively interconnecting said first interconnecting member with said third member of said third planetary gearset, and said sixth torque-transmitting mechanism selectively interconnecting said third member of said second planetary gearset with said third interconnecting member, or said fourth torque-transmitting mechanism selectively interconnecting said first interconnecting member with said third member of said third planetary gearset, said fifth torque-transmitting mechanism selectively interconnecting said third member of said second planetary gearset with said first interconnecting member, and said sixth torque-transmitting mechanism selectively interconnecting said transmission housing with said second interconnecting member, or said first torque-transmitting mechanism selectively interconnecting said input shaft with said third member of said second planetary gearset, said second torque-transmitting mechanism selectively interconnecting said input shaft with said third interconnecting member, said third torque-transmitting mechanism selectively interconnecting said input shaft with said third member of said third planetary gearset, said fourth torque-transmitting mechanism selectively interconnecting said first interconnecting member with said third interconnecting member, said fifth torque-transmitting mechanism selectively interconnecting said transmission housing with said third member of said second planetary gearset, and said sixth torque-transmitting mechanism selectively interconnecting said transmission housing with said third interconnecting member, or said first torque-transmitting mechanism selectively interconnecting said input shaft with said first interconnecting member, said second torque-transmitting mechanism selectively interconnecting input shaft said second interconnecting member, said third torque-transmitting mechanism selectively interconnecting input shaft with said third member of said second planetary gearset, said fourth torque-transmitting mechanism selectively interconnecting said input shaft with said third member of said third planetary gearset, said fifth torque-transmitting mechanism selectively interconnecting third member of said third planetary gearset with said second interconnecting member, and said sixth torque-transmitting mechanism selectively interconnecting said transmission housing with said first interconnecting member, or said third torque-transmitting mechanism selectively interconnecting said input shaft with said third interconnecting member, said fourth torque-transmitting mechanism selectively interconnecting said third member of said second planetary gearset with said third member of said third planetary gearset, said fifth torque-transmitting mechanism selectively interconnecting said transmission housing with said second interconnecting member, and said sixth torque-transmitting mechanism selectively interconnecting said transmission housing with said third interconnecting member, or said second torque-transmitting mechanism selectively interconnecting said input shaft with said third interconnecting member, said third torque-transmitting mechanism selectively interconnecting said input shaft with say third member of said third planetary gearset, said fourth torque-transmitting mechanism selectively interconnecting said second interconnecting member with said third member of said second planetary gearset, said fifth torque-transmitting mechanism selectively interconnecting said second interconnecting member with said third interconnecting member, and said sixth torque-transmitting mechanism selectively interconnecting said transmission housing with said third interconnecting member, or said second torque-transmitting mechanism selectively interconnecting said third member of said second planetary gearset with said input shaft, said third torque-transmitting mechanism selectively interconnecting said input shaft with said third interconnecting member said fourth torque-transmitting mechanism selectively interconnecting said third member of said second planetary gearset with said second interconnecting member, said fifth torque-transmitting mechanism selectively interconnecting said third interconnecting member with said third member of said third planetary gearset, and said sixth torque-transmitting mechanism selectively interconnecting said transmission housing with said third interconnecting member, or said fourth torque-transmitting mechanism selectively interconnecting said first interconnecting member with said third member of said third planetary gearset, said fifth torque-transmitting mechanism selectively interconnecting said second interconnecting member with said third member of said third planetary gearset, and said sixth torque-transmitting mechanism selectively interconnecting said transmission housing with said second interconnecting member, or said second torque-transmitting mechanism selectively interconnecting said input shaft with said third member of said third planetary gearset, said third torque-transmitting mechanism selectively interconnecting said first interconnecting member with said third member of said second planetary gearset, said fourth torque-transmitting mechanism selectively interconnecting said second interconnecting member with said third member of said second planetary gearset, said fifth torque-transmitting mechanism selectively interconnecting said second interconnecting member with said third interconnecting member, and said sixth torque-transmitting mechanism selectively interconnecting said third member of said third planetary gearset with said third member of said second planetary gearset, or said second torque-transmitting mechanism selectively interconnecting said input shaft with said third member of said first planetary gearset, said third torque-transmitting mechanism selectively interconnecting said input shaft with said second interconnecting member, said fourth torque-transmitting mechanism selectively interconnecting said first interconnecting member with said third member of said third planetary gearset, said fifth torque-transmitting mechanism selectively interconnecting said third member of said first planetary gearset with said third member of said third planetary gearset, and said sixth torque-transmitting mechanism selectively interconnecting said transmission housing with said first interconnecting member, or said fourth torque-transmitting mechanism selectively interconnecting said third member of said first planetary gearset with said third interconnecting member, said fifth torque-transmitting mechanism selectively interconnecting said second interconnecting member with said third interconnecting member, and said sixth torque-transmitting mechanism selectively interconnecting said transmission housing with said third member of said first planetary gearset, or said first torque-transmitting mechanism selectively interconnecting said input shaft with said third member of said first planetary gearset, said second torque-transmitting mechanism selectively interconnecting said input shaft with said second interconnecting member, said third torque-transmitting mechanism selectively interconnecting said first interconnecting member with said third member of said third planetary gearset, said fourth torque-transmitting mechanism selectively interconnecting said third member of said first planetary gearset with said third interconnecting member, said fifth torque-transmitting mechanism selectively interconnecting said transmission housing with said third interconnecting member, and said sixth torque-transmitting mechanism selectively interconnecting said transmission housing with said third member of said first planetary gearset.

* * * * *